(12) United States Patent
Mullender et al.

(10) Patent No.: US 7,945,531 B2
(45) Date of Patent: May 17, 2011

(54) INTERFACES FOR A PRODUCTIVITY SUITE APPLICATION AND A HOSTED USER INTERFACE

(75) Inventors: Maarten W. Mullender, Duvall, WA (US); David Koronthaly, Sammamish, WA (US); Jared R. Parker, Bothell, WA (US); Thomas K. Gersten, Redmond, WA (US); Todd J. Abel, Redmond, WA (US); Lawrence M. Sanchez, Kirkland, WA (US); Rolando Jimenez Salgado, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/479,372

(22) Filed: Jun. 29, 2006

(65) Prior Publication Data

US 2007/0074121 A1    Mar. 29, 2007

Related U.S. Application Data

(60) Provisional application No. 60/717,694, filed on Sep. 16, 2005, provisional application No. 60/752,971, filed on Dec. 21, 2005, provisional application No. 60/753,337, filed on Dec. 21, 2005.

(51) Int. Cl.
*G06F 17/30* (2006.01)
(52) U.S. Cl. ...................................................... 707/625
(58) Field of Classification Search ............... 707/104.1, 707/203, 999.104, 625; 715/744, 762, 764, 715/780
See application file for complete search history.

(56) References Cited

U.S. PATENT DOCUMENTS

| 6,424,966 | B1 * | 7/2002 | Meyerzon et al. | 707/3 |
| 6,901,595 | B2 | 5/2005 | Mukundan et al. | 719/316 |
| 7,194,695 | B1 * | 3/2007 | Racine et al. | 715/780 |
| 7,451,163 | B2 * | 11/2008 | Selman et al. | 707/3 |
| 7,487,189 | B2 * | 2/2009 | Whitlock et al. | 707/203 |

(Continued)

FOREIGN PATENT DOCUMENTS

EP    1462960 A2    9/2004

(Continued)

OTHER PUBLICATIONS

Demonstration Overview, "Microsoft Improves Access to Customer Data with New Smart Client Solution," *Microsoft IT Showcase*, Jun. 2005, (1 pg).

(Continued)

*Primary Examiner* — James Trujillo
*Assistant Examiner* — Jorge A Casanova
(74) *Attorney, Agent, or Firm* — Merchant & Gould

(57) ABSTRACT

User interfaces are defined by metadata for use with productivity suite applications in a wrapped window, a task pain, or some other suitable representation. Data can be bound to a data source in a one-way format such that changes from the data source propagate to property fields in the UI form. Data can also be bound to a data source in a two-way format such that changes from the property field of the UI propagate back to the data source. The data source can be a local cache such as for synchronization between a productivity suite application and a line of business (LOB) application (e.g., CRM applications). A rendering engine is arranged to process the UI and data bindings such that custom event handlers are defined in a code behind assembly format. Productivity suite items are accessible from the code behind assembly through a series of item interfaces.

20 Claims, 21 Drawing Sheets

U.S. PATENT DOCUMENTS

| | | | |
|---|---|---|---|
| 2001/0044805 A1 | 11/2001 | Multer et al. | 707/201 |
| 2003/0101223 A1 | 5/2003 | Pace et al. | 709/206 |
| 2003/0137536 A1 | 7/2003 | Hugh | 345/744 |
| 2004/0034688 A1 | 2/2004 | Dunn | 709/206 |
| 2004/0172425 A1* | 9/2004 | Edelstein et al. | 707/203 |
| 2004/0181543 A1* | 9/2004 | Wu et al. | 707/102 |
| 2005/0033588 A1 | 2/2005 | Ruiz et al. | |
| 2005/0193380 A1 | 9/2005 | Vitanov et al. | 717/143 |
| 2005/0223063 A1 | 10/2005 | Chang et al. | 709/206 |
| 2006/0230395 A1 | 10/2006 | Paul et al. | 717/173 |
| 2007/0067354 A1 | 3/2007 | Mullender | 709/221 |

FOREIGN PATENT DOCUMENTS

| | | |
|---|---|---|
| WO | WO 02/065316 A1 | 8/2002 |
| WO | WO 2005/031592 A1 | 4/2005 |

OTHER PUBLICATIONS

John Elliott, "Microsoft Improves Access to Customer Data with New Smart Client Solution," *Microsoft.NET, Microsoft Corporation*, Dec. 2005, (11 pgs).

Abrams, et al.; "*UIML: An Appliance-Independent XML User Interface Language*"; Computer Networks, Elsevier Science Publishers B.V.; vol. 31, No. 11-16; May 17, 1999; pp. 1695-1708.

EP Supplemental Search Report in Appl. No. 06825016.6, mailed Dec. 2, 2008.

Ligang Ren, "*Data Synchronization in the Mobile Internet*"; Computer Supported Cooperative Work in Design, 2002, pp. 95-98.

PCT Published Application No. WO 2004/054671, dated Jul. 1, 2004.

U.S. Appl. No. 11/437,430, entitled "*Productivity Suite to Line of Business Synchronization Mechanism*"; filed May 19, 2006.

Office Action mailed Jan. 8, 2010, in CN Application No. 200680042732.0, w/Translation.

Office Action mailed Nov. 22, 2010, in AU Application No. 2006292299.

Office Action mailed Sep. 11, 2009, in CN Application No. 2006, w/Translation.

Office Action mailed Mar. 9, 2009, in EP Application No. 06825016.6.

Office Action mailed Jan. 21, 2009, in U.S. Appl. No. 11/437,430.

Office Action mailed Sep. 3, 2009, in U.S. Appl. No. 11/437,430.

Office Action mailed Mar. 22, 2010, in U.S. Appl. No. 11/437,430.

Office Action mailed Aug. 3, 2010, in U.S. Appl. No. 11/437,430.

Response to Office Action/Amendment filed Jun. 22, 2009, in U.S. Appl. No. 11/437,430.

Response to Office Action/Amendment filed Mar. 3, 2010, in U.S. Appl. No. 11/437,430.

Response to Office Action/Amendment filed Jul. 22, 2010, in U.S. Appl. No. 11/437,430.

Response to Office Action/Amendment filed Dec. 30, 2010, in U.S. Appl. No. 11/437,430.

Office Action mailed Feb. 15, 2011, in U.S. Appl. No. 11/437,430.

* cited by examiner

INTERFACES FOR A PRODUCTIVITY SUITE APPLICATION AND A HOSTED USER INTERFACE

CROSS-REFERENCE TO RELATED APPLICATIONS

This utility patent application claims the benefit under 35 United States Code §119(e) of U.S. Provisional Patent Application No. 60/717,694 filed on Sep. 16, 2005, U.S. Provisional Patent Application No. 60/752,971 filed on Dec. 21, 2005, and U.S. Provisional Patent Application No. 60/753,337 filed on Dec. 21, 2005, which are hereby incorporated by reference in their entirety. Further, the present application is related to patent application entitled: "PRODUCTIVITY SUITE TO LINE OF BUSINESS SYNCHRONIZATION MECHANISM" having Ser. No. 11/437,430, filed May 19, 2006. The related application is assigned to the assignee of the present patent application and is hereby incorporated by reference.

BACKGROUND OF THE INVENTION

There are a number of productivity suites available to users that include applications for calendaring events, storing contact information, supporting email, storing task information, etc. One example is Microsoft Outlook® available from Microsoft Corporation, Redmond, Wash. Microsoft Outlook® is part of the Microsoft Office® productivity suite. Many users are familiar with such productivity suite applications and use them on a regular basis.

Some productivity suite users also use business software applications or systems developed for particular business uses (also referred to herein as Line of Business or LOB systems). One example is Customer Relationship Management (CRM) systems available from a number of companies. Much information that is managed by LOB systems may include contact management, calendaring of events and tasks, to name a few.

In many cases the productivity suite cannot exchange or synchronize information with the LOB system in automatic manner. For example, if a user adds a business task in the user's productivity suite, the task information will not automatically migrate over to the LOB system. Instead, the information is discovered by the user in each different system. Typically, the user will have to enter the task information for a second time in the LOB system. Some users may want to allow LOB information to be stored in the email systems and synchronized with the LOB information in backend systems.

SUMMARY OF THE INVENTION

The summary found below is provided to introduce a selection of concepts in a simplified form, and is not intended to identify key features or essential features of the claimed subject matter. This summary is also not intended to be used as an aid in determining the scope of the claimed subject matter.

In accordance with various aspects of the disclosed embodiments, a system and method is arranged to permit access to items from a productivity suite application with a dynamically generated user interface. The user interface is processed by a rendering engine so that it can be hosted in a window or task pane of the productivity suite application. The data for the productivity suite items can be provided by a data source that is bound to the UI so that a property field of the UI is updated with changes in the productivity suite items. The property data from the UI can also be bound to the data source so that changes in the property data propagate to the data source for updating the productivity suite items. The productivity suite application may be a personal information manager (PIM) application such as Outlook® (available from Microsoft Corporation, Redmond, Wash.), or some other application such as Lotus Notes, Star Office, etc. Example productivity suite applications include email management, appointment management, scheduling/calendaring management, notes management, task management, contact management, and others.

In a further embodiment, changes to properties in the UI that is hosted by the productivity suite application can propagate to a synchronization data store (SDS). Productivity suite items that are associated with the SDS can be synchronized with a line of business application program so that changes between data items in the productivity suite application and entities in the LOB application are synchronized by use of XML data representations and stored binding information.

In one particular implementation, information that is used for synchronization is stored in an XML data representation. The XML data representation can be stored as a property for the data item in the productivity suite application. The XML data representation can be communicated to the LOB application, which can then handle its own conflict resolution and data storage for LOB entities. Changes to entities in the LOB application can then be provided as an XML, which can subsequently be formatted into a control message that is communicated to the productivity suite application. The XML data representations provide for a uniform interface that is simply managed by each respective application.

In another particular implementation, information that is stored in an XML data representation can be stored as a property in a productivity suite item (e.g., Microsoft Outlook® items) such that productivity suite items can be extended.

In another aspect, encryption of the information is performed on a per user basis. This aspect can advantageously help ensure that the information contained in any PIM item that is sent to an email recipient cannot be read by that recipient and thus cannot be shared inadvertently. In a related aspect, the encryption helps prevent the information from causing unexpected behavior on the recipient's side. For example, in some conventional systems, information contained in appointments can easily be shared when sending invites for the appointment. Thus the user may share information without even being aware. The encryption of the information prevents such an occurrence of inadvertent sharing of information. However, in the case where the user has multiple devices, the described encryption will not prevent the information from being shared across the user's multiple devices.

In another aspect, the information is stored in a personal property, reducing the chance of overwriting. In some conventional systems, information can be implicitly exchanged with the invitees in an appointment request without the requestor's awareness. When the requestor and invitee share the information, either by sending the information explicitly or implicitly, there is the possibility that the information will be stored in the same property. Since the last stored information will be maintained, the information from one of the users may be overwritten. In one aspect of the present disclosure, a specific property name is assigned to store the additional information such that conflicts are avoided.

In another aspect, the information can be promoted and demoted so that elements or attributes of the information (i.e., which is in XML) can be replicated to properties in the containing PIM items. For example, in one implementation, the standard Microsoft Outlook® UI may be used to display or manipulate these values and/or the values may be shared with other users. In one aspect of the present disclosure, an XML data representation is provided to the LOB application so that LOB items can only be changed by the LOB application. In another aspect, the LOB item is formatted in an XML data representation that is then utilized for synchronizing with the productivity suite application items. Since XML can be utilized as the mechanism for transferring information, simplified user interfaces can be implemented for the productivity suite application.

In another aspect, dialogs are mutually synchronized between the productivity suite and the LOB application. The dialogs can be developed in any appropriate language such as, for example, an extensible application markup language (XAML). The synchronization between dialogs advantageously can allow for multiple dialogs showing the exact same item to be opened simultaneously. When the user enters information in one dialog, the information can be automatically changed at all other places where it is being shown. For example, in a Microsoft Outlook® implementation, when the same information is shown in a Microsoft Outlook® dialog (Inspector) and in the task pane or action pane, these need to be synchronized. This aspect provides mechanisms that allow multiple dialogs in Microsoft Outlook® to share the same instance of data (while in the process of editing).

In still another aspect, a productivity suite application on a client machine is configured to send a request via a web server call to update, delete, or create a new entity in the LOB application. The LOB application extracts the request from the client machine, where the request can be provided in an XML data representation. The server machine sends requests via control messages that are embedded in an email to update, delete, or create an item in the productivity suite application, where the item is associated with a LOB entity. The control messages are hidden from the user, and extracted by the client machine for evaluation, conflict resolution, property promotion and binding between the LOB entity and the productivity suite application item.

In a further aspect, a LOB application can communicate a LOB identifier in an email communication, where the LOB identifier is associated with a previous binding between a productivity suite item and a LOB entity. The LOB identifier can be embedded in an email communication in the header associated with the email message. The email communication does not need to contain (embedded or otherwise) the LOB entity itself since the LOB identifier refers to the LOB entity. Once the email message is received, the email handler for the productivity suite can identify a specific productivity suite item in a synchronization shadow or synchronization data store by reference to the LOB identifier. In one example, the user can access the productivity suite item by selecting a link (e.g., a URL link in any number of forms such as HTTP, HTTPS, FTP, FTPS, OBA, etc.), and other embedded information (e.g., an XML data representation, or other data representation) that is associated with the LOB identifier in the email message. In another example, an action pane or task pane can be activated for access to the specific productivity suite item. Since the LOB identifier can be embedded in a link, any desired action associated with the productivity suite item can be taken by configuring the handler (e.g., a URL handler) appropriately.

In still another aspect, user interface (UI) forms can be associated with the productivity suite item or item property via the described binding associations. In one particular aspect, the productivity suite application can dynamically render a UI form by utilizing structured metadata. The structured metadata permits developers to easily customize the UI forms, and in some scenarios the dynamic metadata driven UI forms need not use the binding feature (e.g., the UI form need not be associated with a property of a productivity suite item).

In yet a further aspect, developers can create composite applications by reusing previously created metadata definitions for many different applications. That is, this aspect permits a user to create composite applications based on multiple vendor's application definitions.

Various embodiments may be implemented as a computer process, a computer system (including mobile computing devices and handheld computing devices), or as an article of manufacture such as a computer program product. The computer program product may be a computer medium readable by a computer system and including computer executable instructions for executing a computer process. The computer program product may also be a propagated signal on a carrier readable by a computing system and encoding a computer program of instructions for executing a computer process.

BRIEF DESCRIPTION OF THE DRAWING

Non-limiting and non-exhaustive embodiments are described with reference to the following figures, wherein like reference numerals refer to like parts throughout the various views unless otherwise specified.

Figure 1:
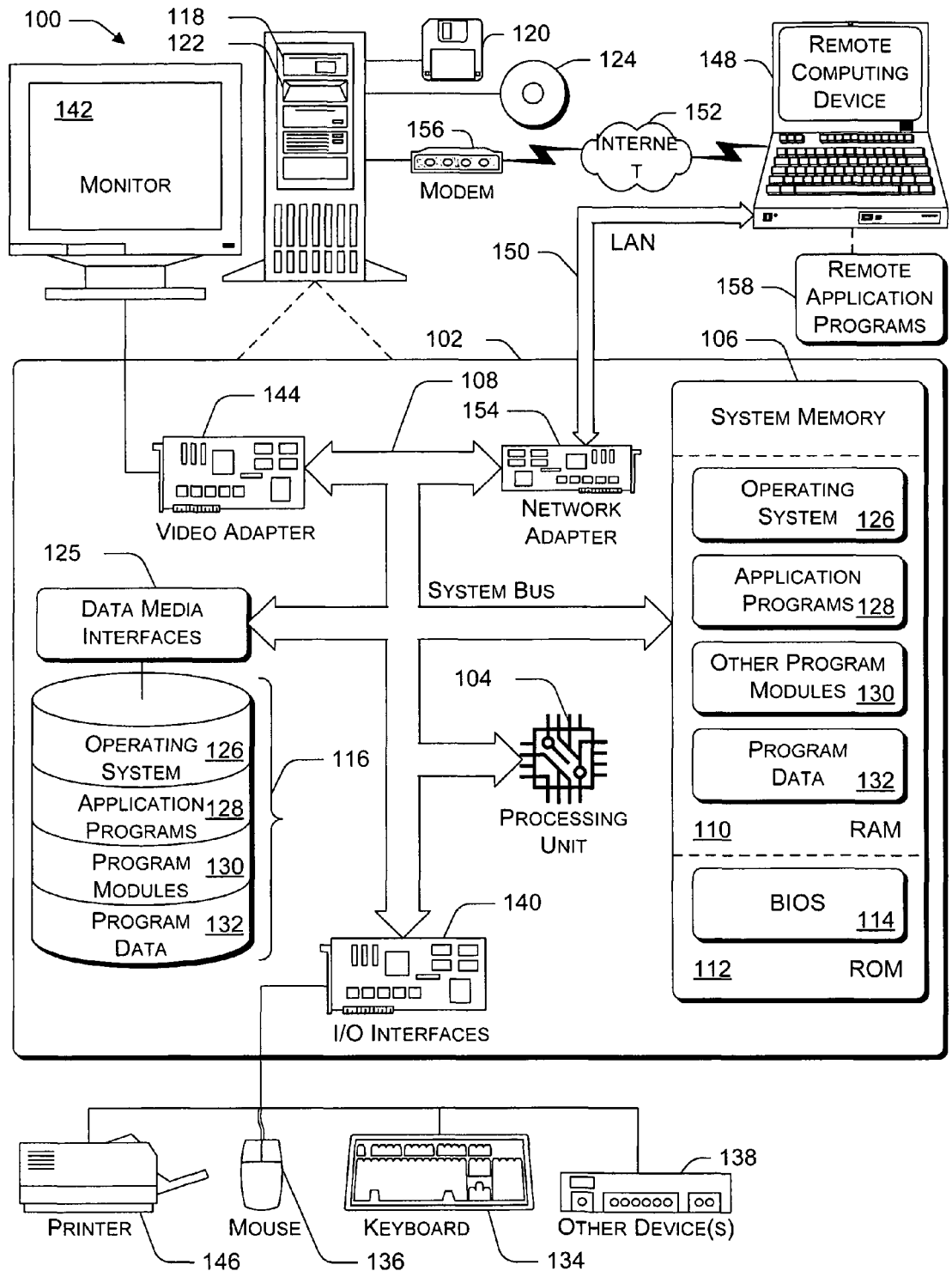
FIG. 1 is a block diagram representing an example general computer environment that can be used to implement the techniques described herein, according to an embodiment.

APPENDIX II illustrates an example schema for interfacing with items in a productivity suite application (e.g., Microsoft Outlook®).

APPENDIX III illustrates definitions for various interfaces, methods, and event handlers for interfacing with items in a productivity suite application (e.g., Microsoft Outlook®).

APPENDIX IV illustrates an example schema for utilizing metadata for defining user interface (UI) forms in a productivity suite application (e.g., Microsoft Outlook®).

DETAILED DESCRIPTION

Various embodiments are described more fully below with reference to the accompanying drawings, which form a part hereof, and which show specific example embodiments for practicing various embodiments. However, other embodiments may be implemented in many different forms and should not be construed as limited to the embodiments set forth herein; rather, these embodiments are provided so that this disclosure will be thorough and complete. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Briefly stated, user interfaces can be defined by metadata for use with productivity suite applications in a wrapped window, a task pain, or some other suitable representation. Data can be bound to a data source in a one-way format such that changes from the data source propagate to property fields in the UI form. Data can also be bound to a data source in a two-way format such that changes from the property field of the UI propagate back to the data source. The data source can be a local cache such as for synchronization between a productivity suite application and a line of business (LOB) application (e.g., CRM applications). A rendering engine is arranged to process the UI and data bindings such that custom event handlers are defined in a code behind assembly format. Productivity suite items are accessible from the code behind assembly through a series of item interfaces.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the embodiment. Accordingly, the logical operations making up the embodiments described herein are referred to alternatively as operations, steps or modules.

Various modules, techniques and methods may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "one embodiment," "an embodiment," or "an example embodiment" meaning that a particular described feature, structure, or characteristic is included in at least one embodiment. Thus, usage of such phrases may refer to more than just one embodiment. Furthermore, the described features, structures, or characteristics may be combined in any suitable manner in one or more embodiments.

One skilled in the relevant art may recognize, however, that embodiments may be practiced without one or more of the specific details, or with other methods, resources, materials, etc. In other instances, well known structures, resources, or operations have not been shown or described in detail merely to avoid obscuring aspects of the embodiments.

Example Computing Environment

FIG. 1 illustrates a general computer environment 100, which can be used to implement the techniques described herein. The computer environment 100 is only one example of a computing environment and is not intended to suggest any limitation as to the scope of use or functionality of the computer and network architectures. Neither should the computer environment 100 be interpreted as having any dependency or requirement relating to any one or combination of components illustrated in the example computer environment 100.

Computer environment 100 includes a general-purpose computing device in the form of a computer 102. The components of computer 102 can include, but are not limited to, one or more processors or processing units 104, system memory 106, and system bus 108 that couples various system components including processor 104 to system memory 106.

System bus 108 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, a PCI Express bus, a Universal Serial Bus (USB), a Secure Digital (SD) bus, or an IEEE 1394, i.e., FireWire, bus.

Computer 102 may include a variety of computer readable media. Such media can be any available media that is accessible by computer 102 and includes both volatile and non-volatile media, removable and non-removable media.

System memory 106 includes computer readable media in the form of volatile memory, such as random access memory (RAM) 110; and/or non-volatile memory, such as read only memory (ROM) 112 or flash RAM. Basic input/output system (BIOS) 114, containing the basic routines that help to transfer information between elements within computer 102, such as during start-up, is stored in ROM 112 or flash RAM. RAM 110 typically contains data and/or program modules that are immediately accessible to and/or presently operated on by processing unit 104.

Computer 102 may also include other removable/non-removable, volatile/non-volatile computer storage media. By way of example, FIG. 1 illustrates hard disk drive 116 for reading from and writing to a non-removable, non-volatile magnetic media (not shown), magnetic disk drive 118 for reading from and writing to removable, non-volatile magnetic disk 120 (e.g., a "floppy disk"), and optical disk drive 122 for reading from and/or writing to a removable, non-volatile optical disk 124 such as a CD-ROM, DVD-ROM, or other optical media. Hard disk drive 116, magnetic disk drive 118, and optical disk drive 122 are each connected to system bus 108 by one or more data media interfaces 125. Alternatively, hard disk drive 116, magnetic disk drive 118, and optical disk drive 122 can be connected to the system bus 108 by one or more interfaces (not shown).

The disk drives and their associated computer-readable media provide non-volatile storage of computer readable instructions, data structures, program modules, and other data for computer 102. Although the example illustrates a hard disk 116, removable magnetic disk 120, and removable optical disk 124, it is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on hard disk 116, magnetic disk 120, optical disk 124, ROM 112, and/or RAM 110, including by way of example, operating system 126, one or more application programs 128, other program modules 130, and program data 132. Each of such operating system 126, one or more application programs 128, other program modules 130, and program data 132 (or some combination thereof) may implement all or part of the resident components that support the distributed file system.

A user can enter commands and information into computer 102 via input devices such as keyboard 134 and a pointing device 136 (e.g., a "mouse"). Other input devices 138 (not shown specifically) may include a microphone, joystick, game pad, satellite dish, serial port, scanner, and/or the like. These and other input devices are connected to processing unit 104 via input/output interfaces 140 that are coupled to system bus 108, but may be connected by other interface and bus structures, such as a parallel port, game port, or a universal serial bus (USB).

Monitor 142 or other type of display device can also be connected to the system bus 108 via an interface, such as video adapter 144. In addition to monitor 142, other output peripheral devices can include components such as speakers (not shown) and printer 146 which can be connected to computer 102 via I/O interfaces 140.

Computer 102 can operate in a networked environment using logical connections to one or more remote computers, such as remote computing device 148. By way of example, remote computing device 148 can be a PC, portable computer, a server, a router, a network computer, a peer device or other common network node, and the like. Remote computing device 148 is illustrated as a portable computer that can include many or all of the elements and features described herein relative to computer 102. Alternatively, computer 102 can operate in a non-networked environment as well.

Logical connections between computer 102 and remote computer 148 are depicted as a local area network (LAN) 150 and a general wide area network (WAN) 152. Such networking environments are commonplace in offices, enterprise-wide computer networks, intranets, and the Internet.

When implemented in a LAN networking environment, computer 102 is connected to local area network 150 via network interface or adapter 154. When implemented in a WAN networking environment, computer 102 typically includes modem 156 or other means for establishing communications over wide network 152. Modem 156, which can be internal or external to computer 102, can be connected to system bus 108 via I/O interfaces 140 or other appropriate mechanisms. It is to be appreciated that the illustrated network connections are examples and that other means of establishing at least one communication link between computers 102 and 148 can be employed.

In a networked environment, such as that illustrated with computing environment 100, program modules depicted relative to computer 102, or portions thereof, may be stored in a remote memory storage device. By way of example, remote application programs 158 reside on a memory device of remote computer 148. For purposes of illustration, applications or programs and other executable program components such as the operating system are illustrated herein as discrete blocks, although it is recognized that such programs and components reside at various times in different storage components of computing device 102, and are executed by at least one data processor of the computer.

Following is a description of example interfaces and configuration implemented in Microsoft Outlook® to support synchronization of Microsoft Outlook® information with a LOB system. In other embodiments, different productivity suite applications can be used instead of or in addition to Microsoft Outlook®.

Example Configuration

Figure 2:
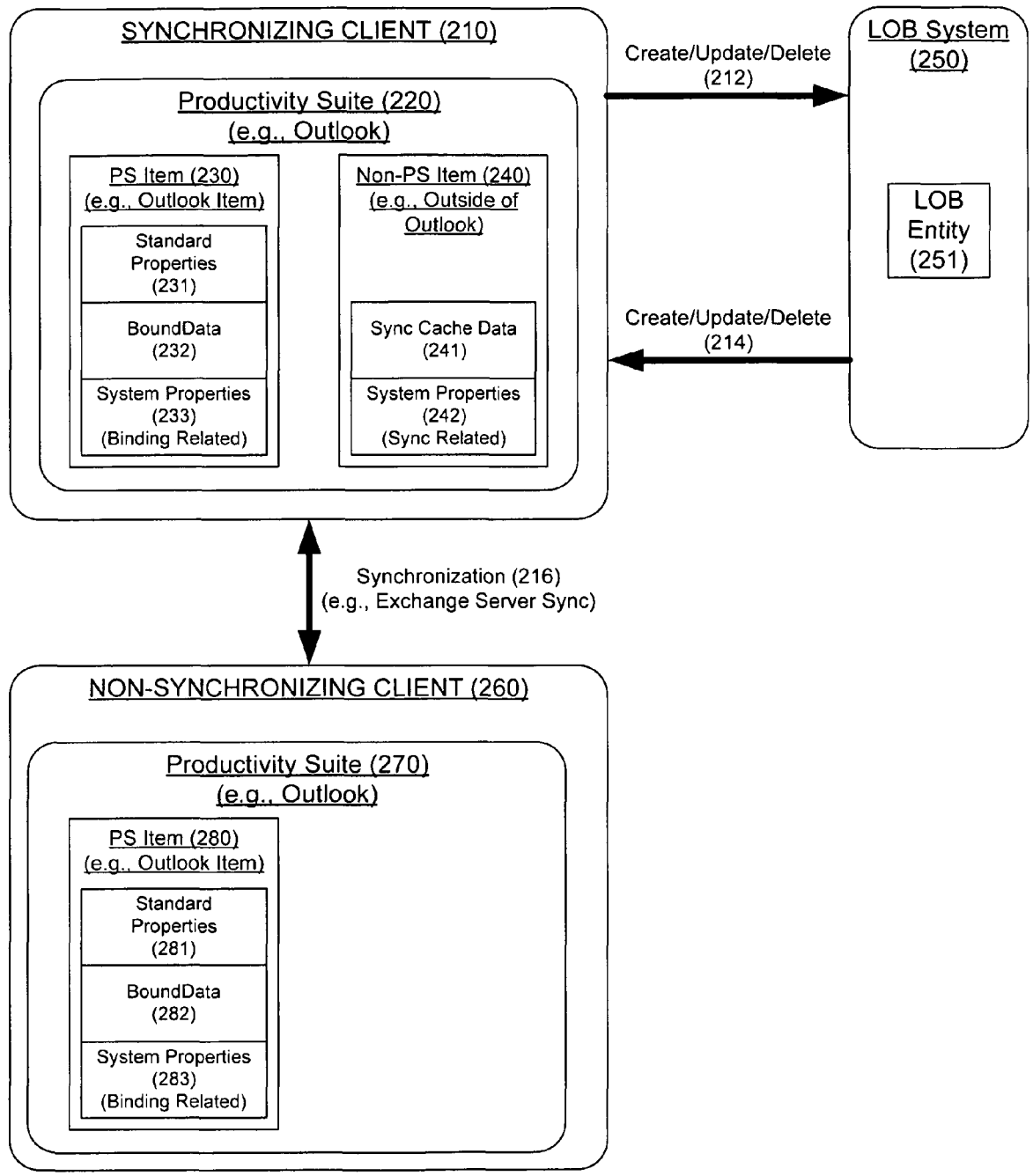
FIG. 2 illustrates an example system where a client device is arranged for synchronization with a LOB system.

FIG. 2 illustrates an example system where a client device is arranged for synchronization with a LOB system. As shown in the figure, a Productivity Suite (220) such as Microsoft Outlook® is available on a client device. Microsoft Outlook® maintains one or more items such as: calendar appointments, contacts, email, etc. Each productivity suite item (230) includes a set of standard properties (231) that relate to the productivity suite, and a one or more data items (BoundData 232) that are related to the LOB system. Additional system properties are also associated with the item such as may be necessary for binding data and properties to the item (e.g., binding information in system property 233). Outside of the item (240), there is a set of system properties that are related to synchronization (242), as well as a data store that is used to cache synchronization data (241).

A single user must be able to install the client software on multiple machines. However, only the primary machine is able to synchronize with the LOB System. Other machines are considered secondary machines. The LOB System returns a business response synchronously to the primary machine. The LOB system interfaces with a formatter to provide LOB System-originated "commands" to the primary machine such as create, update or delete commands. At any time, there can only be one primary machine. Secondary machines (e.g., client 260), which include their own copy of the productivity suite (270) still contain a copy of the information available on the primary machine, including business and synchronization status of BoundItems (e.g., productivity item 280, including properties 281-283). The described system can be arranged to maintain a synchronization cache on a server to distribute business status responses from the server to the secondary clients.

Productivity suite items (e.g., item 230) should hold enough information for the system to recognize and render BoundItems. BoundData (including promoted properties) should be stored and associated with the productivity suite item. System information stored in productivity suite items should be static. In other words it should not change once it's set to avoid introducing "artificial" synchronization conflicts. The system should store synchronization data and system properties related with synchronziation outside of the productivity suite items. A token that is hidden in a property can be used to designate which machine is the primary. In some instances, the token can be passed so that the primary machine can be changed such as in the case of disaster recovery.

Figure 3:
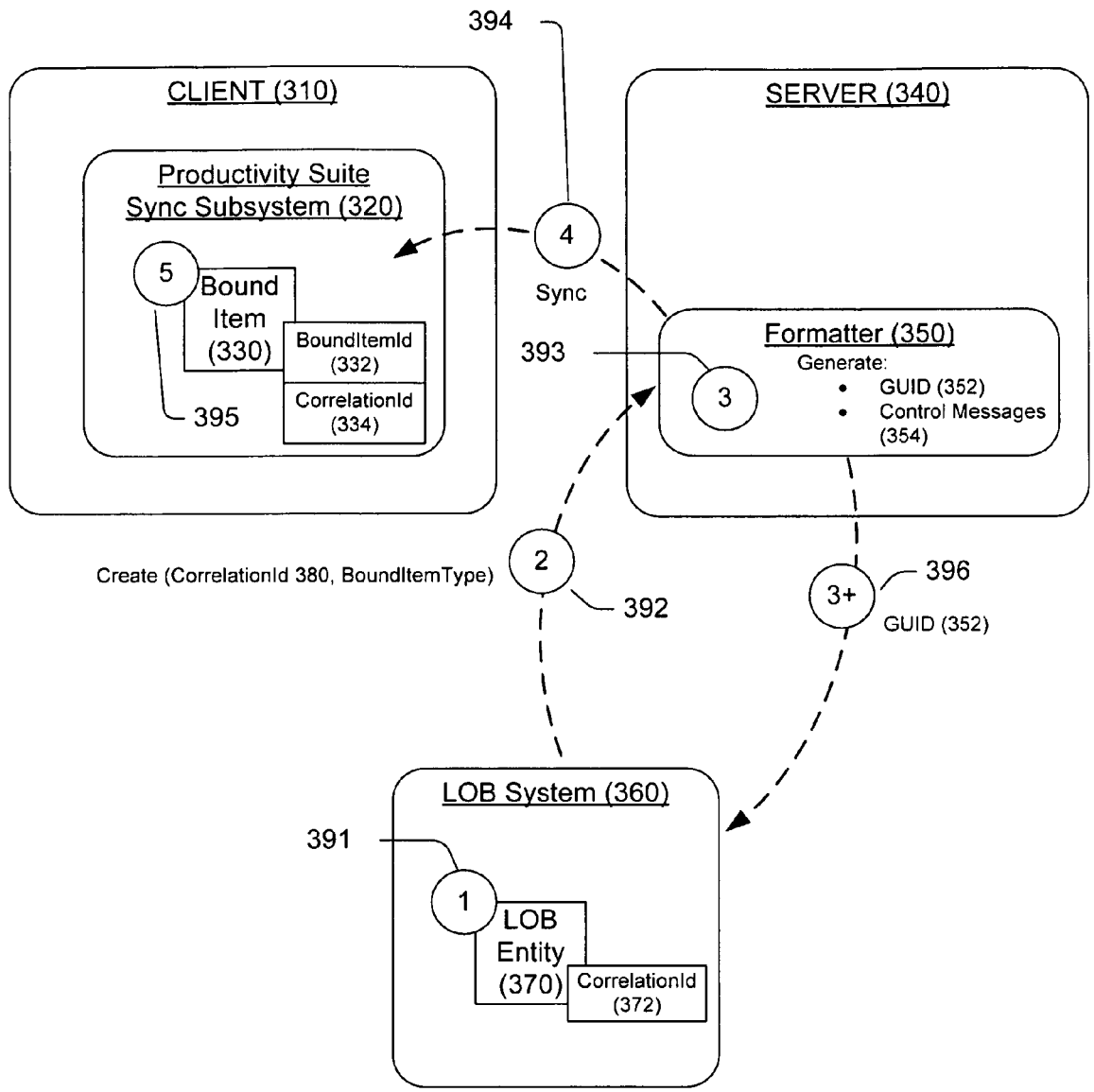
FIG. 3 illustrates how the correlation between a bound item and a LOB entity is set when a new bound item is created by the LOB system.

FIG. 3 illustrates how the correlation between a bound item (330) and a LOB entity (370) is set when a new bound item is created by the LOB system. First, the LOB entity (370) is created in the LOB system (360) as designated by step 1 (391), where the LOB entity (370) includes an identifier (CorrelationId 372). The LOB system (360) communicates a request (392) to the server (340) to create the LOB entity identified by CorrelationId 372 as a bound item as designated by step 2. The server (340) receives the request (392) and applies a formatter (350) to the request (392), resulting in communication of a command (394) to the primary client (310) to create the binding. The synchronization subsystem (320) for the productivity suite (e.g., Microsoft Outlook®) on the client (310) receives the command (392) during the next synchronization and creates a binding to a productivity suite item as designated by step 5 (395). The bound item has a unique identifier (BoundItemId 332) that is assigned to it, and is associated with the LOB entity by CorrelationId 334.

Figure 4:
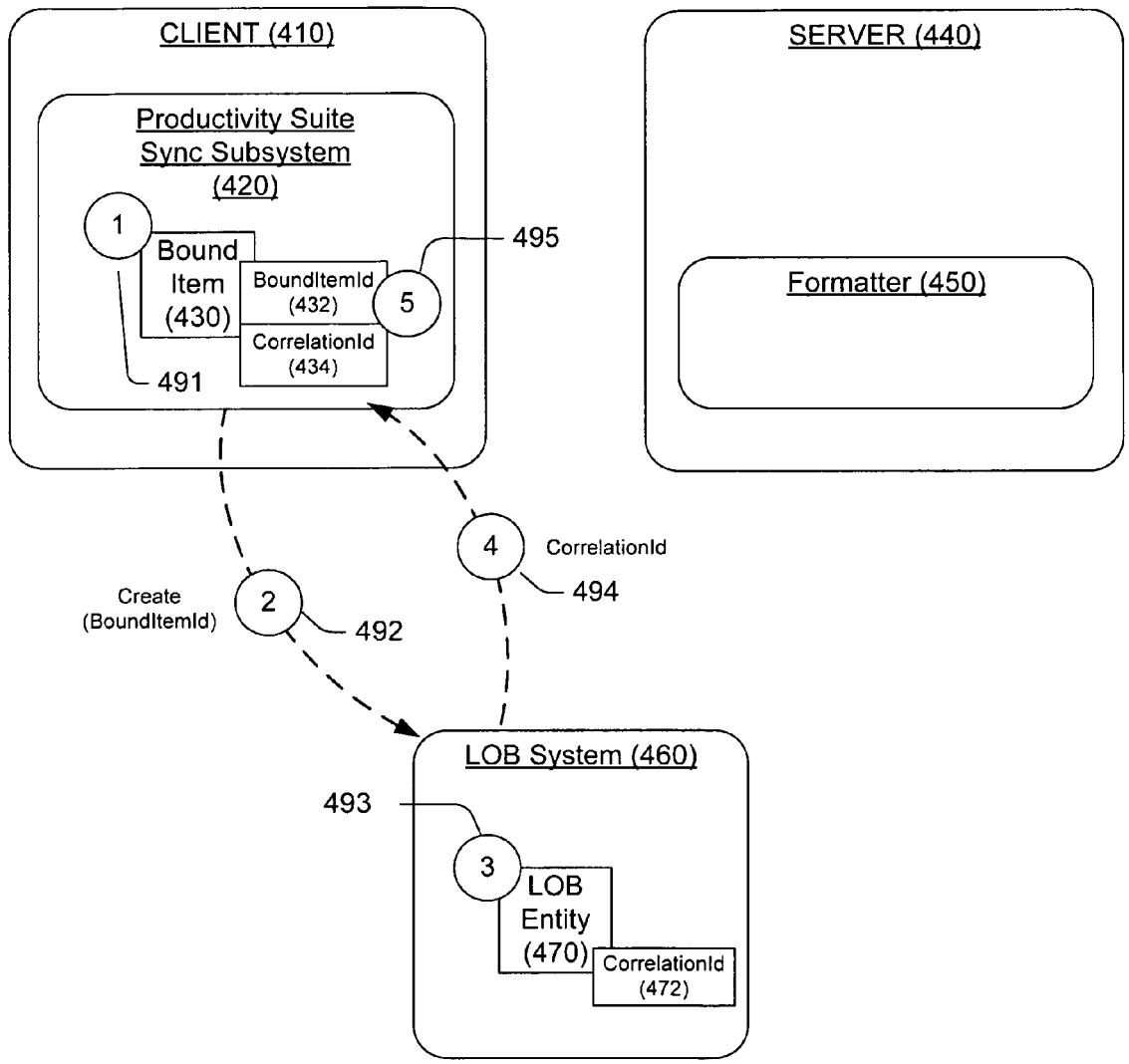
FIG. 4 illustrates how the correlation between a bound item and a LOB entity is set when a new bound item is created in the productivity suite.

FIG. 4 illustrates how the correlation between a bound item and a LOB entity is set when a new bound item is created in the productivity suite. First, the item (430) is created in the productivity suite as designated by step 1 (491). Next, the synchronization subsystem (420) in the productivity suite (e.g., Outlook®) communicates (492) a create binding command to the LOB system (460) as designated by step 2. The LOB system (460) receives the create binding command during the next synchronization with the client, and creates a LOB entity (470) identified by CorrelationId 472, as illustrate by step 3 (493). The LOB system (460) optionally communicates the CorrelationId (472) back to the client (410) at step 4 (494), where the client (410) can then associate the CorrelationId (434) with the bound item (430) as illustrated by step 5 (495). In some instances the CorrelationId (472) is not communicated back to the productivity suite.

Figure 5:
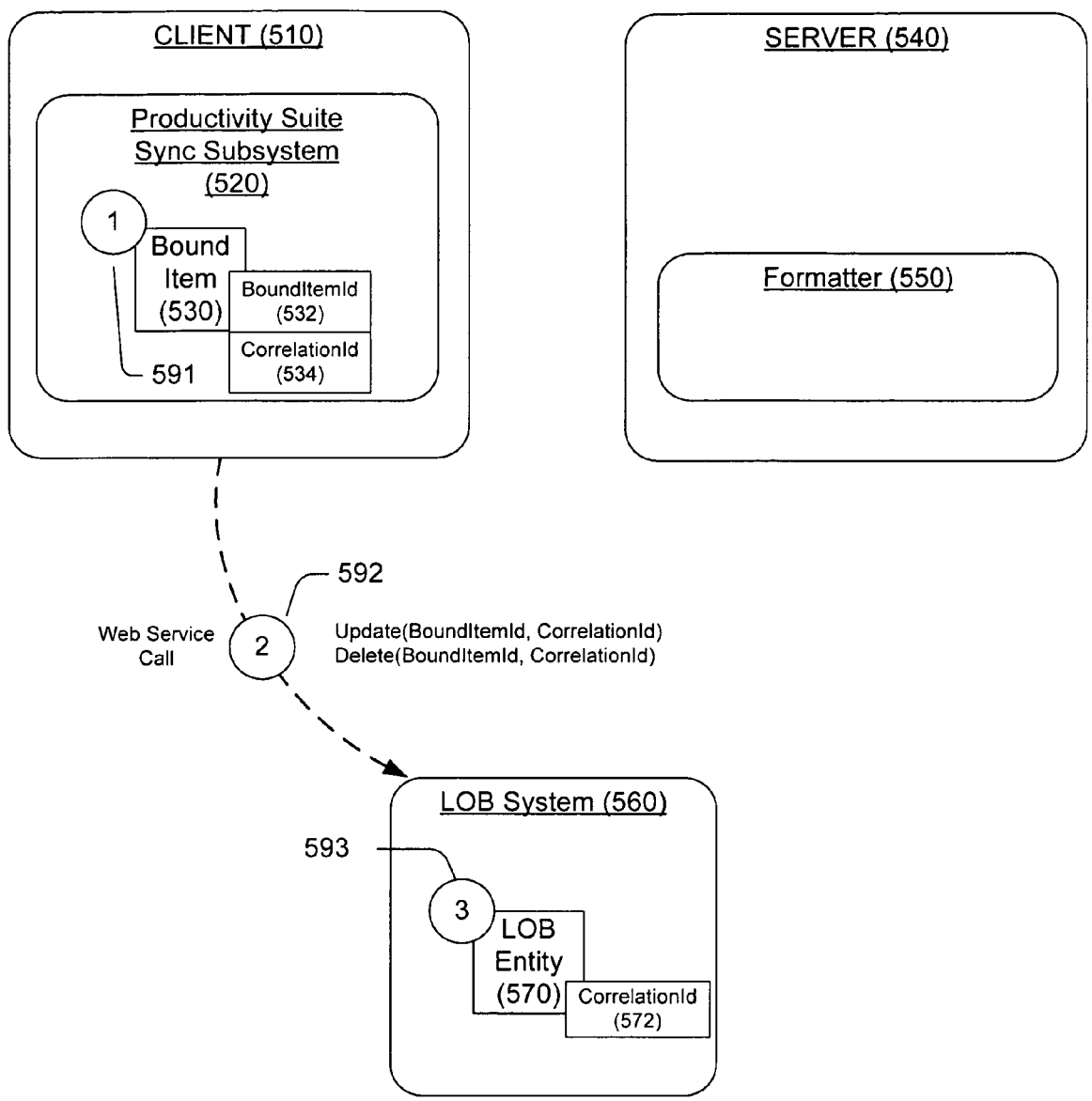
FIG. 5 illustrates how the correlation between a bound item and a LOB entity is changed when a bound item is updated or deleted in the productivity suite.

FIG. 5 illustrates how the correlation between a bound item and a LOB entity is changed when a bound item is updated or deleted in the productivity suite. First, the item (530) is changed in the productivity suite as designated by step 1 (591). Next, the synchronization subsystem (520) in the productivity suite (e.g., Outlook®) communicates (e.g., through a web service call) either update or delete to the LOB system (560) as designated by step 2 (592). The LOB system (560) receives the update/delete binding command during the next synchronization with the client (510), and modifies or deletes the LOB entity (570) identified by CorrelationId 572, as illustrate by step 3 (593). In some instances where the CorrelationId (534) is not known by the productivity suite, the LOB system (560) references the binding identifier BoundItemId 532 to determine which LOB entity (570) to modify or delete.

Figure 6:
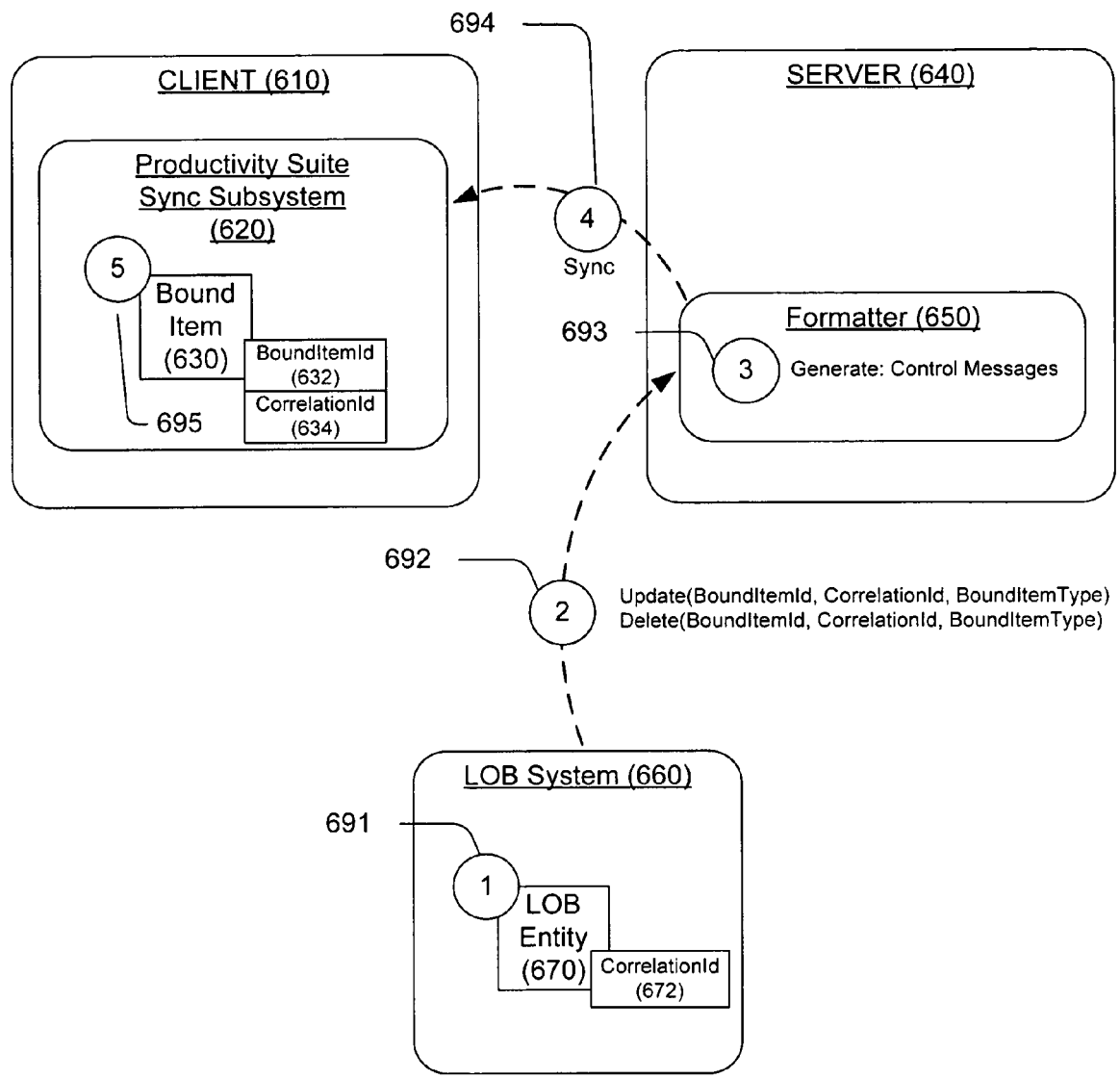
FIG. 6 illustrates how the correlation between a bound item and a LOB entity is changed when a bound item is updated or deleted by the LOB system.

FIG. 6 illustrates how the correlation between a bound item and a LOB entity is changed when a bound item is updated or deleted by the LOB system. First, the LOB entity (670) is modified or deleted in the LOB system (660) as designated by step 1 (691). The LOB system (660) communicates a request (692) to the server (640) to update or delete the LOB entity identified by at least one of the CorrelationId (672) and the BoundItemId in the request (692) to the server (640). The server (640) receives the request (692) and applies a formatter (650) to the request (692), resulting in communication of a command or control message (694) to change or delete the bound item as designated by step 4. The synchronization subsystem (620) for the productivity suite (e.g., Outlook®) on the primary client (610) receives the command during the next synchronization and modifies or deletes the binding (e.g., BoundItemId 632 and CorrelationId 634) to the appropriate bound item (630) as designated by step 5 (695).

The synchronization subsystem described above is deployed to client machines that can be inside or outside of a corporate network. Virtual private network or VPN connectivity to the corporate network is expected, as is HTTP type remote synchronization connections via a server application such as Microsoft Exchange Server. LOB Synchronization can run as a background thread on the client device as long as the productivity suite is running. Changes made in the productivity suite are submitted to the LOB system, via any available Remote Procedure Call ("RPC") mechanism (e.g., corporate network, VPN, HTTP, etc.), while changes the LOB system are expected to be made only on the corporate network. File synchronization can be handled in any appropriate way within the corporate network, such as via Microsoft Active Directory, which can be arranged to expose a .NET API for such purposes.

Example Synchronization Interface Definitions

For each Bound Item Type, the synchronization system will execute a different action depending on the change that occurs (create/update/delete). In addition to this, a "Query" action can be invoked as a result of processing a Query Control Message. Example synchronization interface definitions using a schema with Microsoft Outlook® are further illustrated in Appendix I. The following descriptions specify the information that needs to be passed into and returned from each of these actions.

Create is invoked by the system whenever a client side Bound Item creation is processed: Parameters for Create include BoundItemId, BoundItemType, RequestId, BoundData, and CultureName BoundItemId is a client generated unique identifier string for the Bound Item. BoundItemType is a string that corresponds to a fully qualified name of the Bound Item Type including solution and version. RequestId is a unique identifier for the update message to allow the LOB System to identify duplicates. BoundData is an XML document that is defined by a schema for the LOB system such that BoundData for the Bound Item is properly provided. CultureName is the name of the culture that should be used for business status, descriptions and any other messages derived from the Create call. Return values for Create include CorrelationId, RequestId, BusinessStatus, and Description. CorrelationId is a string that is LOB-generated as a unique identifier for the item type (e.g., ContactId uniquely identifies the contact). RequestId is a unique identifier for the update message to allow the primary client to identify duplicates. BusinessStatus is a string that corresponds to a short name of the new business status that must be assigned to the Bound Item as a result of the Create. It is an arbitrary value provided by the LOB System, the sync does not make any assumptions on the contents of this value. The idea is that this value could be used to filter items that are in the same state. Description is an optional string that is an explanation about the BusinessStatus. This will be part of the Bound Item information so it could be exposed Description on the UI if desired.

Update is invoked by the system whenever a client-side Bound Item update is processed. Parameters for Update include BoundItemId, BoundItemType, RequestId, CorrelationId, OldBoundData, NewBoundData, and CultureName. Return values for Update include CorrelationId, RequestId, BusinessStatus, and Description. RequestId is a unique identifier for the update message to allow the LOB System to identify duplicates. The same RequestId must be sent if a duplicate update message is sent. OldBoundData is an XML document that corresponds to all BoundData from the Bound Item from the last synchronized state.

Delete is invoked by the system whenever a client-side Bound Item deletion is processed. Parameters for Delete include CorrelationId, BoundItemId, BoundItemType, RequestId, BoundData, and CultureName. Return values for Delete include CorrelationId, RequestId, BusinessStatus, and Description.

QueryResult is invoked by the system whenever a Query Control Message is processed. The parameter for QueryResult are RequestId for the message and BoundItemType, CorrelationId, and optionally BoundData for all existing BoundItems of the specified types. There are no return values for Query Result.

Example Control Message Definitions

This section specifies the information that is expected in each Control Message type. Control messages include: a Create Control Message, an Update Control Message, a Delete Control Message, and a Query Control Message.

The Create Control Message includes fields for: BoundItemId, CorrelationId, BoundItemType, and BoundData. The Update Control Message includes fields for: CorrelationId, BoundItemType, and BoundData. The Delete Control Message includes fields for: CorrelationId and BoundItemType. The Query Control Message includes a field for BoundItemType.

BoundItemId is a unique identifier to be assigned to the new Bound Item. BoundItemID is generated by the Formatter as will be described in more detail later. BoundItemType is a string that corresponds to a fully qualified name of the Bound Item Type including solution and version. The BoundItemType can be used by the system to locate the corresponding Bound Item Definition, which describes the properties to be bound to the productivity suite item and how the productivity suite item is to be synchronized with the LOB entity. As previously described, CorrelationId is the unique identifier assigned by the LOB System to the Bound Item, and BoundData is an XML document containing all of the BoundData for the Bound Item.

Example Synchronization System

The system can be arranged such that it does not rely on events from the productivity suite (e.g., Microsoft Outlook®) to invoke and detect synchronization. In order to detect changes (create/update/delete) the system uses a 3-way synchronization approach, between the productivity suite, a synchronization data store (SDS), and the information obtained directly from the LOB System. Data can be changed from multiple entry points in the system. Information can be changed on many different places including from web access, mobile devices, and from other client machines. Changes will eventually be synchronized to a primacy client machine (e.g., via Outlook®/Exchange synchronization).

The LOB System can detect and handle duplicate requests based on a unique RequestId. Outbound (client to server) communication with the LOB System can be made through web services, while inbound (server to client) messages will flow to the clients via the server application (e.g., Microsoft Exchange).

Conflict detection is also handled by the system when the same Bound Item is changed by the LOB System and the productivity suite. If the system detects that the same Bound Item has been updated by the user and the LOB System, a Conflict will be identified and conflict resolution will address it appropriately.

The LOB System supports providing immediate business responses when a synchronous Web Service call is received. The LOB System does not need to receive a confirmation or error notification about successful processing of Create, Update, Delete, or Query commands.

This section describes the high-level communication flows between the LOB System and the Client. The following diagrams provide an overview of possible communication flows that are supported.

Figure 7:
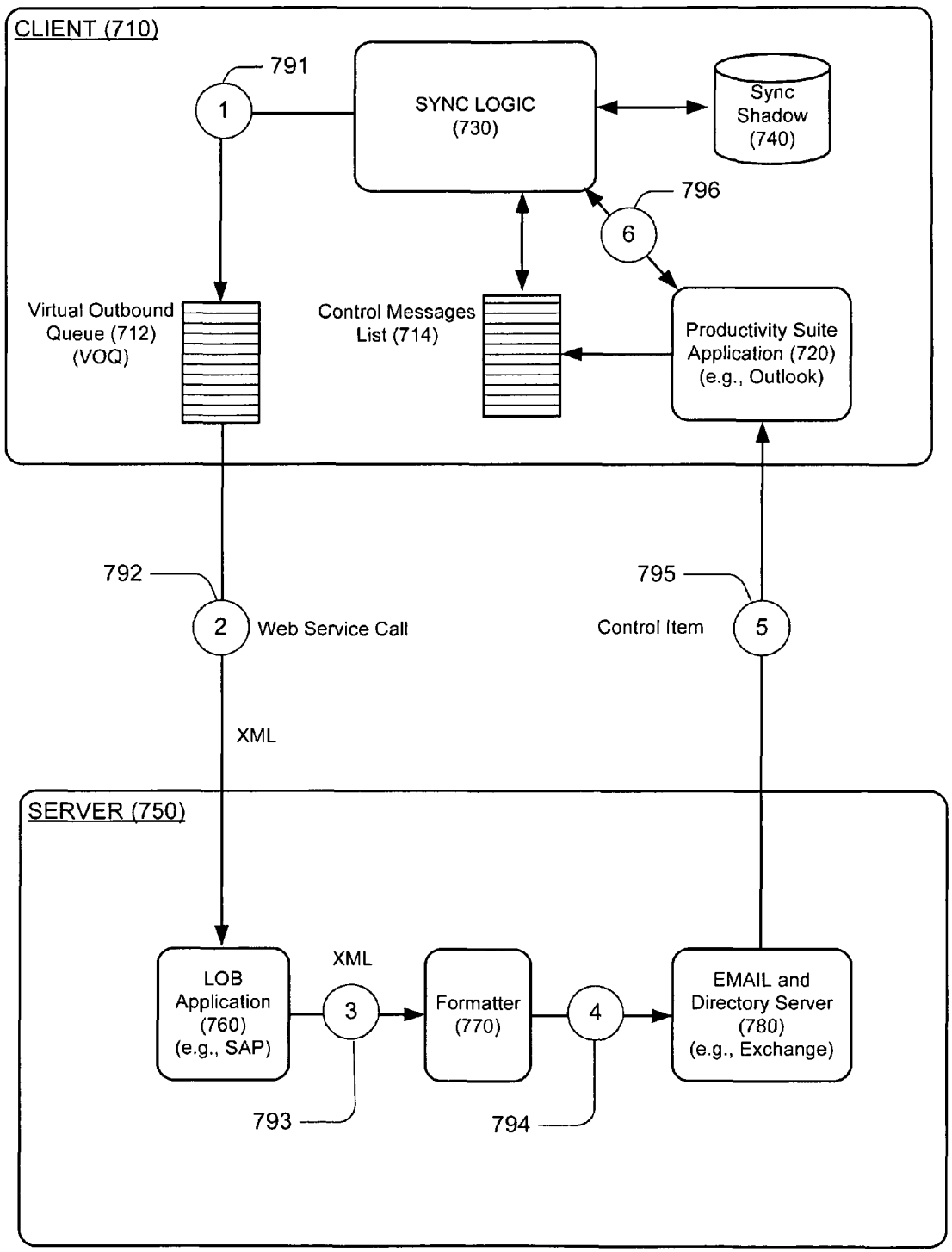
FIG. 7 illustrates an example communication flow between a client and server during a push operation.

FIG. 7 illustrates an example communication flow between a client and server during a push operation. The push operation can be initiated by the client (710) or the server (750) as will be described.

Step 1 illustrates a client (710) initiated flow, wherein a change detection process is executed by the system on the Client. At step 1, the synchronization logic (730) in the system identifies new, updated and deleted BoundItems and creates (791) a virtual list of change requests that need to be submitted to the LOB System. The virtual list can be provided in a queue such as a virtual outbound queue (VOQ 712). The list is processed when there is connectivity (e.g., web service call 792) to the LOB System (e.g., server 750) at step 2. If no connectivity with the LOB System is identified at step 2, then the list is re-tried the next time the change detection process is run.

When creating the virtual list of requests, the system also takes into account new incoming Control Messages (create, update, delete notifications coming from the LOB System, from Control Message List 714) to detect and resolve or raise conflicts appropriately. A Conflict is detected by the synchronization logic (730) when the same item has been modified in the productivity suite and the LOB System or when one side tries to update an item when the other is trying to delete it. For each detected change (create, update, delete) that does not result in a Conflict, the system submits a request to the LOB System (e.g., server 750) by calling a Web Service (792) such as described in the Synchronization Interface Definitions.

The LOB System (e.g., server 750 with LOB application 760) can also trigger the execution of create, update, delete, or query actions on the client (710) when relevant actions occur on the LOB system. At step 3 the LOB system calls a web service (793) that is exposed by the Formatter (770). In case of create requests, the Formatter (770) returns the Unique Id that will be used by the system to identify the new Bound Item. For details about the information sent as part of the Web Service call see the Synchronization Interface Definitions section discussed herein.

At step 4, the Formatter (770) generates a Control Message (794) and sends it to the specified mailbox associated with the productivity suite (e.g., an Outlook® mailbox). The Control Messages (794) are sent from a dedicated account. When the Control Message is delivered to the target mailbox (e.g., by Microsoft Exchange Server, or some other EMAIL and directory server 780) it is automatically moved to a hidden folder by a server-side rule such that accidental deletion of Control Messages is prevented. The server-side rule is maintained (created and re-created) by the Client (e.g., see Outlook® Add-in specification for more details).

At step 5, Control Messages (795) are delivered to the Client (710) via an email-type of mechanism that is formatted for the productivity suite application (720). The client (710) processes the Control Messages (795) at step 6 (796) by executing a synchronization process that creates, updates and deletes BoundItems as required. When processing Control Messages, the system also takes into account local changes (create, update, delete of BoundItems) that need to be communicated to the LOB System to detect and flag Conflicts appropriately.

Figure 8:
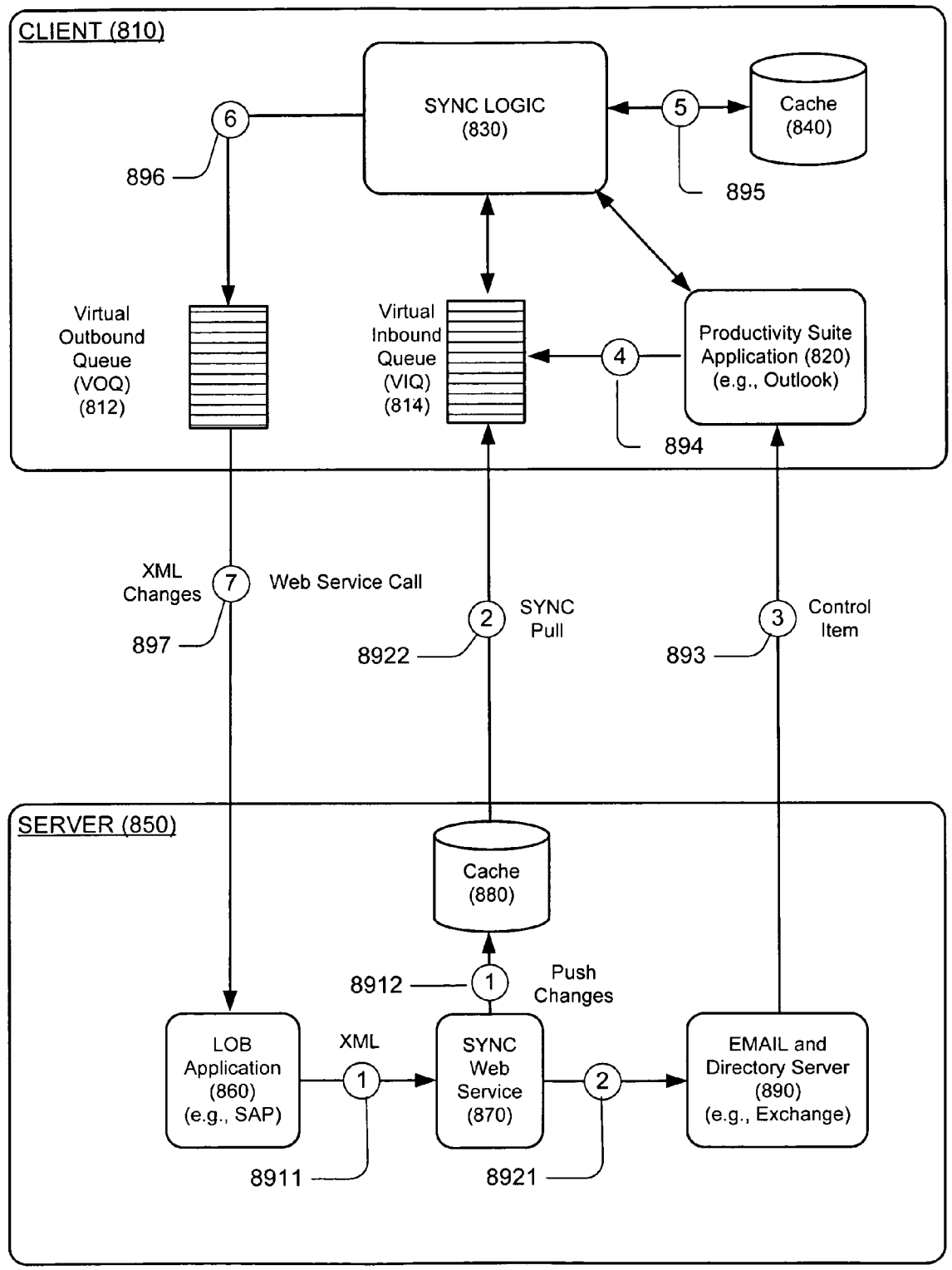
FIGS. 8 and 9 illustrate a pull operation that can be employed in another example system.
Figure 9:
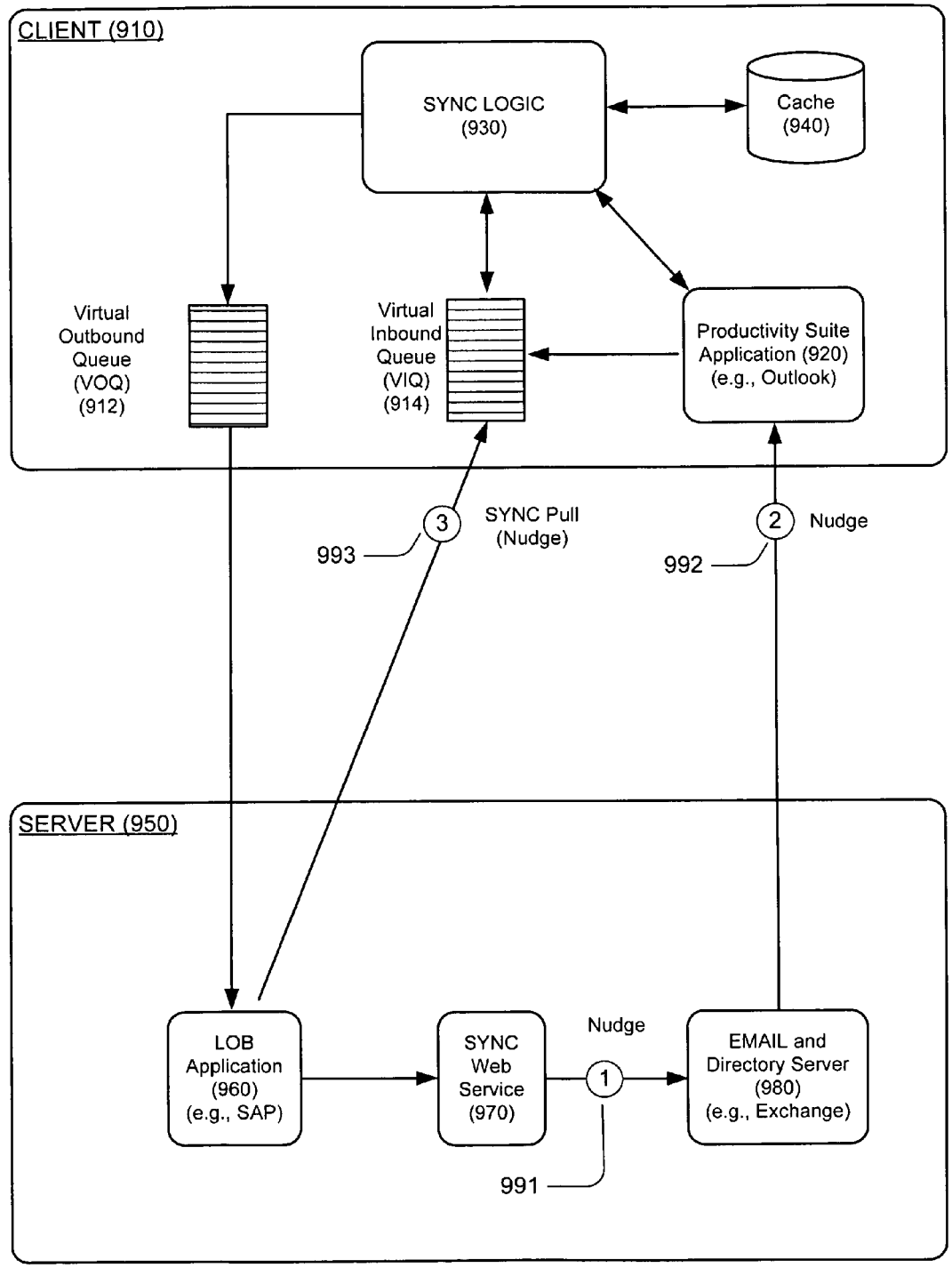

FIGS. 8 and 9 illustrate a pull operation that can be employed in another example system, where the pull can be initiated by a synchronization web service or by a nudge that is imitated by the LOB system.

Synchronization Logic

BoundItems may be changed because the user changes them directly or indirectly through synchronization (e.g. a web access interface). A process is needed that compares the items and determines the differences between the client and the LOB system to decide whether changes on one side should be propagated to the other side.

A change may occur in one of four ways. First, the user may change a Bound Item in the productivity suite. The system detects and automatically submits a change request to the LOB System. Second, the change can be made through another Client and this affects both the productivity suite client through synchronization and the LOB System. The changes to the productivity suite and the LOB System may occur in any sequence with any delay. Third, the change may be made through Smartphone, web access, or any other means and is synchronized via the server to the productivity suite. These changes need to be found through a synchronization process. Fourth, the change can be made in the LOB System itself. Each type of change must be considered by the synchronization process.

A local Synchronization Data Store (SDS) stores the original version. The SDS is synchronized with and subsequently used to track deltas between the productivity suite and the LOB System. The deltas are then added to a virtual request queue containing all the service requests to the LOB System. The update procedures determine when changes need to be propagated to the LOB System. The synchronization logic formulates a request, and submits it to the LOB System when there is connectivity. When updating the productivity suite, the synchronization logic uses the LOB System's information to update productivity suite information (e.g., Outlook®) and then updates the SDS.

Most bound data exist in two places: as an item in the productivity suite and in the LOB system. It is assumed that each copy contains additional data that don't exist on the other copy. The synchronization system is responsible for synchronizing: a shared subset of properties stored in the BoundData property of the bound item, and the existence of the bound item, e.g. the item could be created or destroyed as a result of the synchronization. The synchronization system assumes a single definition of truth: the LOB system is always right. At the same time the synchronization system does not have any direct access to LOB entities, and is thus keeping a separate copy in the SDS of what it assumes is stored in the LOB system.

The synchronization process can be divided into several distinct phases. In the sweeping phase all BoundItems in the mailbox are compared against the SDS. Mismatches in referential integrity between the mailbox and the SDS are detected and immediately fixed. Modified items are detected and marked for further processing. Deleted items are then detected and passed to the synchronizer, so that appropriate delete request can be sent to LOB system. In some implementations, the various phases of the synchronization process described above can be merged into a single integrated process where the various functions (e.g., binding, sweeping, resolving, etc.) can be combined in a simplified algorithm. The simplified algorithm may achieve improve execution speed or achieve some other improved efficiency (e.g., reduce memory/disk usage, eliminate redundancies, etc.).

Any control messages that are identified are processed during the second phase. Next, property promotion occurs for all items that were marked as modified. The resulting updated XML data representation is compared with the SDS copy and the synchronizer is notified. The synchronizer runs in a background thread and in this embodiment uses SDS copies. The synchronizer is responsible for submitting Create, Update and Delete requests as well as processing queries.

The SDS copy contains the same properties mentioned above. Under normal circumstances the EntryID, BoundItemID, BoundItemType and CorrelationId are the same for the productivity suite item and in the SDS copy. Any differences between the productivity suite item and SDS copy are interpreted as a request to update the LOB entity. If not, the referential integrity is broken and the productivity suite item must be investigated further. The major causes of any differences are: the item has been created by the user, there is no SDS copy for this item yet but the BoundData property is readable, and the item has been copied, moved or deleted by the user, the mapping between EntryID and BoundItemID has been broken; there might be zero, one, or more items all related to a single SDS copy and the BoundData properties are readable, an updated meeting request or task request has been received by the user; it has corrupted corresponding appointment or task (bound item). The EntryID of the item has been preserved but the BoundData property is not readable anymore. A copy of foreign bound item has been received from another user. The BoundData property is not readable and there is no corresponding copy for this item in SDS. A copy or a bound item has been sent to another user, and then it has been sent back. This is a variation of previous possibilities and it cannot be recognized as a special case. A data corruption could have happened.

There is a built-in assumption that BoundItemID is unique (primary key) and that the combination of BoundItemType+ CorrelationId is also unique (secondary key). These restrictions must be enforced in the SDS database. Of course, in the mailbox the EntryID is also unique. Any item where the BoundData property is unreadable or where the duplicate properties stored inside do not match the same properties (BoundItemId, BoundItemType and CorrelationId) on the productivity suite item (e.g., an Outlook® item) is considered corrupt. As a general rule, such a corrupt item is automatically unbound. Any duplicate item (when more then one Outlook®) item has the same BoundItemID) is detected and either converted to a new bound item or unbound; the original is matched with SDS copy (in the case of move we pick one copy).

Communication Flow

Figure 10:
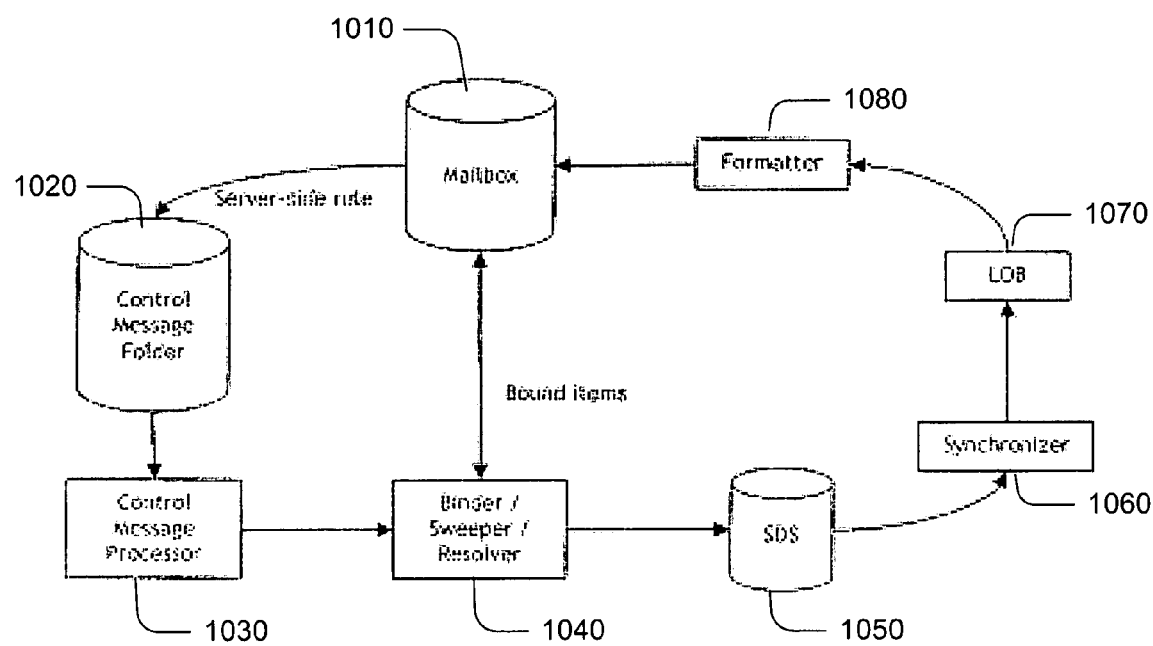
FIG. 10 illustrates an example design of the synchronization subsystem for a productivity suite that is used on a client machine.

FIG. 10 illustrates another example communication flow between a productivity suite on a client and a LOB system. The LOB system (1070) can initiate updates to BoundItems via control messages (Create, Update and Delete). The Formatter (1080) service creates control messages as requested by LOB system (1070). The control messages are communicated to the productivity suite via email message in a mailbox (1010). A server side rule moves the control message into a designated (hidden) folder (e.g., control message folder 1020), from which they are picked by a control message processor (1030). Create, Update and Delete requests are processed immediately; while Query requests are queued in a SDS (1050) and are processed by the synchronizer (1060). The Binder/Sweeper/Resolver (1040) service (or services depending on the implementation) is arranged to: compare all BoundItems in the mailbox (1010) against the SDS (1050), and identify mismatches/changes in the BoundItems.

Although not a very common, but still important scenario involves the LOB system recreating all BoundItems for a given user. This can be used to populate the mailbox with initial BoundItems, as well as part of a disaster recovery when some items have been lost or become corrupt. A variation of this scenario could be used to upgrade existing BoundItems to a new binding definition (schema). It can also request information about a current state of BoundItems (Query). Another common use is to send regular mail messages to the user's mailbox (1010); in this case the synchronization system is not involved.

An identity of the sender is used to distinguish valid control messages from unauthorized (or spoofed) control messages. The information in the control message can be encrypted in order to protect its privacy.

The primary machine is responsible for processing control messages, promoting properties, resolving conflicts and submitting updates to LOB. It keeps SDS and mailbox synchronized. The secondary machine can be used to update BoundItems via UI. It is also building its own SDS database using synchronization, but with some important differences. The secondary machine is not processing control message and does not do property promotion during synchronization, nor does the second machine submit changes to the LOB system. When building a SDS the secondary machine assumes the data in the mailbox is correct. Any failures to update a SDS due to referential integrity issues are silently ignored since it is assumed that the primary machine will eventually resolve the conflict and that the resolution will be propagated to the secondary machine. The important consequence of these rules is that the SDS on the secondary machine does not contain the full state of any pending changes and therefore it cannot be promoted to the primary one.

The server can be arranged to maintain a synchronization cache (e.g., similar to the SDS but excluding the bound data information) for the purposes of distributing business status responses from the server to the various secondary client machines. Periodically, the server can push out changes to the secondary client so that the secondary clients have the latest copy of the relevant SDS data.

Synchronization Subsystem

Figure 11:
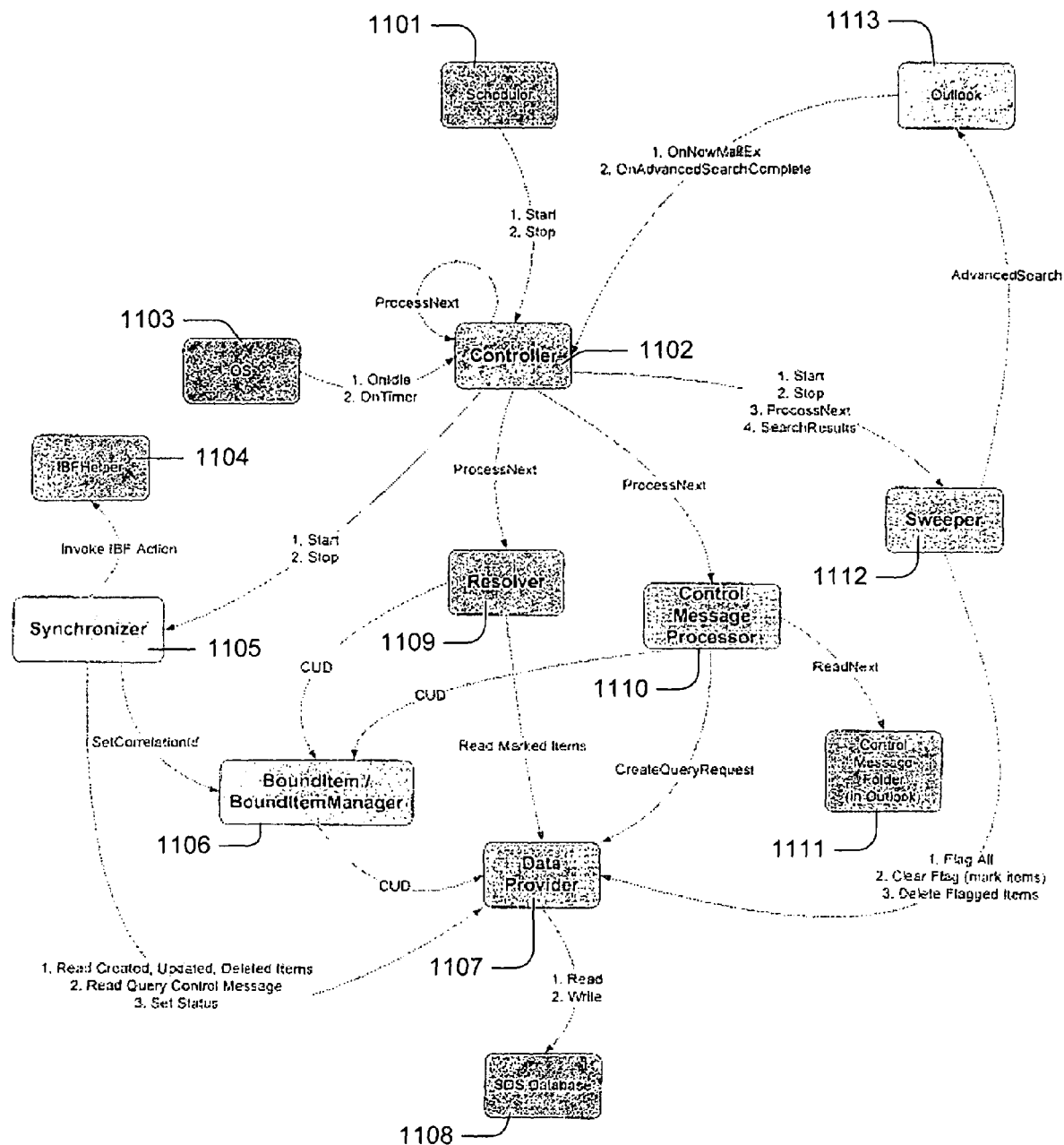
FIG. 11 illustrates another example communication flow between a client and server.

The synchronization subsystem is illustrated in FIG. 11, and is composed of the following major components: a Controller (1102), a Bound Item Manager (1106), a Sweeper (1112), a Resolver (1109), a Control Message Processor (1110), a Data Provider (1107), and a Synchronizer (1105).

The Controller (1102) is a public component used to control the synchronization process.

The Bound Item Manager (1106) is a public component that is used to create and/or directly access the BoundItems. A Bound Item Wrapper may be included that is a public wrapper that encapsulates the productivity suite item as a bound item, or unbinds the item. In some implementations, the functionality of the Bound Item Manager (1106) can be included as part of the Controller (1102), or part of another component.

The Sweeper (1112) is an internal component used to find BoundItems that need to be investigated (because they have changed since the last synchronization occurred). In some implementations, the functionality of the Sweeper (1112) can be included as part of the Controller (1102), or part of another component.

The Resolver (1109) is an internal component used to investigate BoundItems and either to resolve the changes locally (via property promotion) and/or to mark them for full synchronization. In some implementations, the functionality of the Resolver (1109) can be included as part of the Controller (1102), or part of another component.

The Control Message Processor (1110) is an internal component used to process control messages from a monitored designated folder (1111) for messages sent by the Formatter. The control messages are processed to update productivity suite items in the case of Create/Update/Delete verbs or to submit Query commands to be processed by the synchronizer component. In some implementations, the functionality of the Control Message Processor (1110) can be included as part of the Controller (1102), or part of another component.

The Data Provider (1107) is an internal component, providing access to the SDS data tables (1108). In some implementations, the functionality of the Data Provided (1107) can be included as part of the Controller (1102), or part of another component.

The Synchronizer (1105) is an internal component responsible for: notifying the LOB systems when BoundItems are created, updated, or deleted on the client, updating the Synchronization Data Store (SDS 1108) after successful notifications, processing Query control messages, and reporting the state of the synchronization process. In some implementations, the functionality of the Synchronizer (1105) can be included as part of the Controller (1102), or part of another component.

Figure 12:
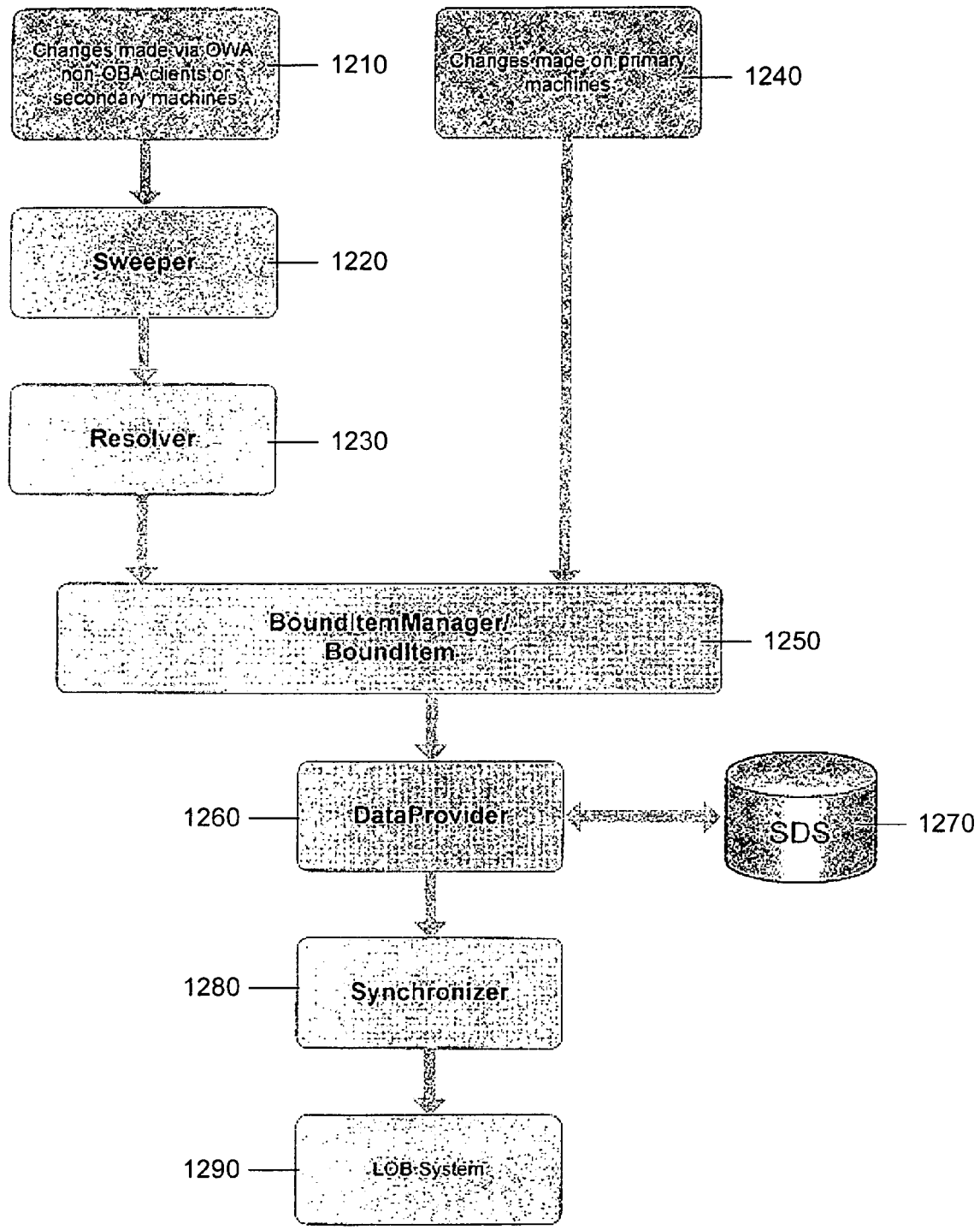
FIG. 12 illustrates an example synchronization subsystem.

Synchronization of Changes is illustrated by FIG. 12 as follows below. Changes to BoundItems can be made on the primary machine (an OBA enabled machine) or through another external interface such as from a web-service (e.g., Outlook® Web Access or OWA), or some other non-OBA enabled clients and mobile devices. Depending on where the changes are made the system will synchronize those using slightly different code paths.

Managing BoundItems: Enabled Clients

The user can create, update and delete BoundItems in a Client that is enabled for synchronization such as through an add-in or plug-in component. The system detects the changes and automatically submits change requests to the LOB System. The request is processed and the LOB System sends back an application level success or failure response. This response is received by the Client and the application business status of the Bound Item is updated. In case of new BoundItems (e.g., created in Outlook®), the response from the LOB System is used by the system to correlate the Bound Item with an LOB Entity.

Managing BoundItems: Web Access

The user accesses their mailbox through web access. BoundItems are exposed to the user as standard items. The user can change the standard information normally, but not the extended information. The user can update or delete existing BoundItems, but cannot create new ones, except for the case of copying an existing Bound Item (indirect create). When the user goes back to their primary machine, the changes made through the web access are synchronized by the server application (e.g., through Microsoft Exchange). The system detects the changes and automatically submits the appropriate change requests to the LOB System.

Managing BoundItems: Non-Enabled Clients

The user may access their mailbox using a productivity suite client that is not enabled. BoundItems appear as standard items. The user can change the standard information normally, but not the extended information. The user can update or delete existing BoundItems, but cannot create new ones. The user then synchronizes with the server application (e.g. Microsoft Exchange). When the user goes back to their primary Client machine, the changes made in the non-enabled client are synchronized from the server application. The system detects the changes and automatically submits the appropriate change requests to the LOB System.

Managing BoundItems: Mobile Devices

The user accesses their mailbox through a mobile device. No special support is provided for mobile devices, they are treated just like web access. BoundItems are exposed to the user as standard items. The user can change the standard information normally, but not the extended information. The user can update or delete existing BoundItems, but cannot create new ones. When the user goes back to their primary Client machine, the changes made in the mobile device are synchronized by the server application (e.g., Microsoft Exchange). The system detects the changes and automatically submits the appropriate change requests to the LOB System.

Managing BoundItems: Multiple Enabled Clients

The user has a "primary" client machine and any number of "secondary" client machines, where each machine has an installed client application that enables synchronization between productivity suite applications and the LOB system. The user can create, update or delete BoundItems in any machine. Changes made on one machine will be synchronized to the others via the server application (e.g., Microsoft Exchange), but in one embodiment only the primary machine will be able to synchronize with the LOB System. The "primary" machine is designated at installation time; other machines will be considered "secondary" machines. There is no specific limit to the number of secondary machines a user can have. When connectivity to the LOB System is available on the primary machine, the system will automatically submit the required change requests to the LOB System.

The described system can be arranged such that a synchronization cache is maintained on the server for the purposes of distributing business status responses from the server to the various secondary client machines. For this example, the server's synchronization cache is updated before and after each primary client sweep. The server's synchronization cache may consist of all data from the SDS excluding the BoundData. According to a sweep interval schedule, the server's synchronization cache can be downloaded from the server to each secondary client's own SDS.

Managing BoundItems: Propagation of Changes

When changes to relevant to business entities are made in the LOB System, the server application will be notified via the Formatter. A change notification is delivered to the Enabled Clients that may need to apply the changes to the Bound Item. Since the change notice is pushed out, the clients does not need to ping for an update and can immediately respond without waiting for a scheduled synchronization time.

Synchronization Method

Figure 13:
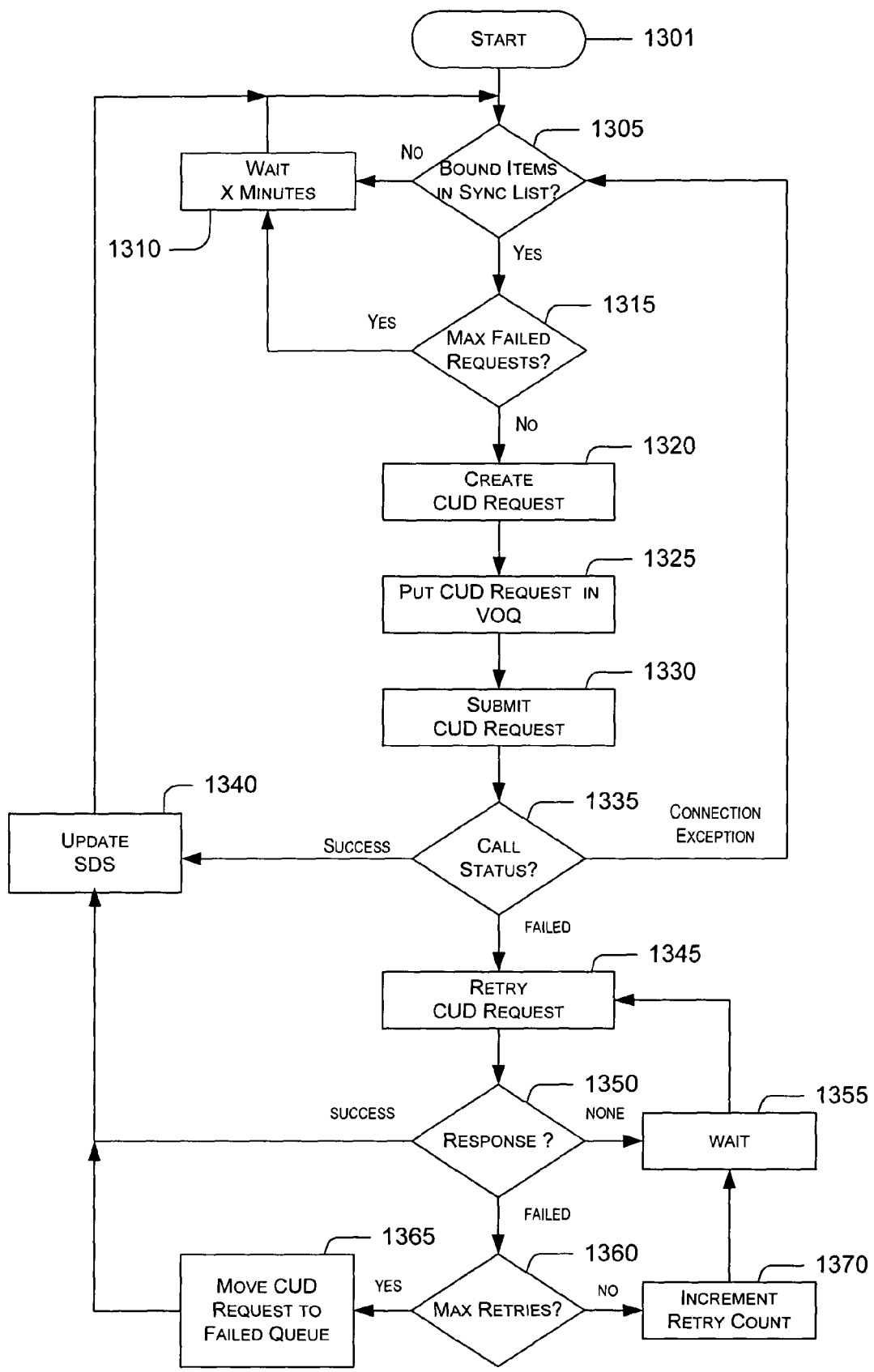
FIG. 13 is a flow chart for an example synchronization method.

FIG. 13 is a flow chart for an example synchronization method. Periodically, the system Sweeper process can locate and "mark" BoundItems that need to be synchronized, where those items are placed in a logical list for synchronization (Sync List). For each item in the Sync List, a create, update, or delete request (CUD Request) is generated and stored in the outbound queue (e.g., VOQ 712 from FIG. 7). A web service call is then initiated so that a connection can be established to the LOB system. The web service call can succeed, fail, or generate a connection exception.

A successful connection is established when a response is obtained from the LOB in response to the web service call. For a successful connection to the web service, the system updates the bound item copy in the SDS with the information from the response. Additional CUD Requests are processed similarly for each item in the Sync List.

A failed connection results when an exception other than a connection exception is provided from the LOB system in response to the web service call. For a failed connection to the web service, the CUD Request is kept in the outbound queue and marked for retry. A retry count for the CUD request can be initialized when the first failed connection is identified. Retries will continue until either a successful connection is established or the maximum number of attempts permitted over a predetermined time interval reaches a limit. The CUD request is moved to a Failed Requests Queue when the maximum number of attempts permitted is reached without success. Additional CUD requests will not be processed unless a successful connection is achieved.

A connectivity exception can occur when the client has a valid authentication cookie and the ping to the target server fails. The system skips to the next item on the Sync List when the connectivity exception results from a web service call.

An example process flow for synchronization is illustrated by FIG. 13, as will be described below. Processing starts at block 1301, and flows to decision block 1305.

At decision block 1305, the productivity suite synchronization system evaluates the sync list to identify any BoundItems that need to be synchronized between the productivity suite application and the LOB application. When no BoundItems are on the sync list, processing flows to block 1310 where the system waits a predetermined time (e.g., X minutes) before evaluating the sync list again. When BoundItems are found in the sync list, the system determines if the maximum number of failed requests has been reached at block 1315. When the maximum number of requests has been reached, processing again flows to block 1310. Alternatively, processing continues at block 1320 where a CUD request is created.

Continuing to block 1325, the CUD request is placed in an outgoing request queue such as VOQ 712 from FIG. 7. At block 1330, the productivity suite application synchronization system submits each request in the outgoing request queue to the LOB system through a service call such as a web service call. Continuing to decision block 1335, the CUD call request is evaluated to determine if the request was successfully submitted to the LOB system. Processing continues from decision block 1335 to block 1340 (where the synchronization data store or SDS is updated) when the CUD call request is successful. Processing flows from decision block 1335 to block 1345 when the CUD call request fails. In some instances, a connection exception is generated and processing flows from decision block 1335 to decision block 1305.

At block 1345, the synchronization system for the productivity suite application attempts a retry for the CUD call request. At decision block 1350, the system determines if a response is received from the call request. When the response is successful, processing flows from decision block 1350 to block 1340 where the SDS is updated. When the response fails, processing flows from decision block 1350 to decision block 1360. If no response is received, processing continues from decision block 1350 to block 1355, where the system, waits for a timeout to expire before attempting another retry at block 1345.

At decision block 1360, the system determines if the maximum number of retries for the CUD call request has been reached. When the maximum number of retries has been reached, processing continues to block 1365 where the CUD request is moved to a failed queue. When the maximum number of retries has not been exceeded, the system increments an internal retry counter at block 1370, and proceeds to block 1355 to wait for another retry.

Referencing Synchronized Items

As previously described, bindings are created between LOB entities and PS items. While the synchronization system does not have any direct access to LOB entities, the SDS keeps a separate copy of what it assumes is stored in the LOB system. When a binding between an LOB entity and a PS item is created, a copy of the synchronized PS item can be placed in the SDS such that the PS item can be indexed with CorrelationId associated with the LOB entity. In other words, a PS item that is associated with an LOB entity can be retrieved from the SDS with reference to CorrelationId. Since the PS item can be retrieved with reference to the CorrelationId, a number of interesting applications, plug-ins, or other software methods can be implemented that may utilize the PS item (e.g., a backend workflow system).

In one example, an LOB application can communicate an LOB identifier (e.g., CorrelationId) to a productivity suite application via an email communication. The email communication includes embedded information that refers to the LOB item. For example, CorrelationId can be embedded in a header associated with the email message. The email communication does not need to contain (embedded or otherwise) the LOB item itself since the CorrelationId refers to the LOB entity. Once the email message is received, the email handler for the productivity suite can identify a specific productivity suite item in a synchronization shadow or synchronization data store that by reference to the LOB identifier.

In another example, the user can refer to the productivity suite item with a link (e.g., a URL link in any number of forms such as HTTP, HTTPS, FTP, FTPS, OBA, etc.) that refers to the LOB identifier associated with a PS item in the SDS.

In still another example, an action pane, task pane, or other software methodology such can be activated when the LOB system sends an email message to the productivity suite system. Once activated, the software methodology can retrieve the productivity suite item from the SDS by referencing the CorrelationId, and then act upon the productivity suite item.

The actions that can be performed on the productivity suite item by the software methodology may result in a create, update, or delete of a productivity suite item, which can then be synchronized with the LOB system as previously described. The LOB system can effectively communicate a task to the productivity suite user by referencing the software methodology and the LOB identifier in the email communication.

In one example software methodology, the email communication from the LOB system can communicate a request for the user to complete a review or approval associated with the specific productivity suite item that is synchronized with the LOB entity identified with the LOB identifier. The email communication can be communicated automatically by the LOB system when a deadline in the LOB system arrives, or when provided by a specific user of the LOB system. The email can be created by the LOB system by communicating information (e.g., via an XML data representation, via text, via embedded data, etc.) to the formatter, which then cooperates with the EMAIL and Directory Server (see e.g., FIG. 7) to generate the email message. The email can stress the need to finalize an action that is associated with the productivity suite item, provide further explanations, etc., where the email can refer to the tasks in a backend workflow system. Since the productivity suite application can interpret a link embedded in the email communication as a task, the actual task information can be presented automatically. The user can then select, and follow the link to open the task item in the productivity suite application, where the associated synchronized backend information can be stored in an XML data representation. Since the LOB identifier can be embedded in a link, any desired action associated with the productivity suite item can be taken by configuring the handler (e.g., a URL handler) appropriately.

Productivity Suite Item Interface Definitions

A variety of interfaces can be utilized to facilitate customized user interface (UI) forms and other interactions with productivity suite items. The various interfaces are accessible from application code, and are provided between the productivity suite items and the application code. There is an additional set of interfaces that can be used between the runtime engine and the application code. Metadata can be utilized to define UI forms as will be described. Although many of the examples provided below are described with reference to Microsoft Outlook®, the examples are equally applicable to any productivity suite application. Examples of productivity suite item interface definitions using a schema for Microsoft Outlook® are further illustrated in Appendix II.

In general the following interfaces can be defined for a productivity suite application such as Microsoft Outlook®, namely: IWIndow, IWindowCodeBehind, IBoundItem, and IBoundItemManager. Appendix III further illustrates definitions for various interfaces, methods, and event handlers for interfacing with items in a productivity suite application (e.g., Microsoft Outlook®).

The IWindow interface, in one embodiment, describes the behavior of a wrapped Outlook® item that is typically an Inspector window, including definitions for accessors to get the underlying Outlook® item, and all methods used to define panes and dialogs. The IWindow interface definition includes:

IntPtr Handle {get;}
        This gets the handle for the wrapped window.
    object Native {get;}
        This returns the object for the underlying productivity suite item.
    IBoundItem Item {get;}
        This returns the BoundItem being displayed in the wrapped window.
    IBoundItem AssociatedItem {get;}
        This returns the BoundItem associated with the wrapped window.
    void ShowPane(XmlNode context;}
        This method allows application developers to display a region in the Application Pane (e.g., an Information Bridge Framework or IBF region). The Outlook® Add-In handles the complexities of displaying the Floating Pane with the appropriate size and position. Context is the information required for selecting metadata that describes the pane contents.
    void ShowDialog(XmlNode context;}

This method allows application developers to display dialog boxes within a region of the Application Pane. Context is the information required for selecting metadata that describes the dialog in the pane.

void RegisterPage(IXamlPage xamlPage}

This is called by the window manager service whenever a new XAML renderer engine is created. XamlPage is the interface to the newly created XAML page.

The IWindowCodeBehind interface, in one embodiment, defines events that can be handled by application developers in their own custom code. The IWindowCodeBehind interface definition includes:

void OnInit(IWindow window, IServiceProvider serviceProvider)

This method is called when an Inspector window (specified as the IWindow that is initialized) is opened and associated code behind assembly has been specified in metadata. The method is passed an object that implements the IWindow interface that the developer can use to access both the window and the associated productivity suite item.

void OnSelectControl(string name, string param)

This method is called when a custom solution control or button is selected. The name of the solution control is defined in the SolutionControls XML passed as the name argument, allowing application developers to dispatch actions appropriately. Also, the param defined in the metadata are passed to this method and defined in the SolutionControls XML.

void OnSelecTab(int index, string name, string caption)

This method is called when the user clicks on a different tab in the Inspector window. The index parameter is the zero-based order of the tab being selected. The name parameter is the name of the tab as specified in the XAML page. The caption parameter is the caption of the tab as specified in the XAML page as text.

void OnNewPage(IXamlPage xamlPage)

This method is called when a new XAML engine wrapper is created for the window. XamlPage is the XAML page being created.

The IBoundItem interface, in one embodiment, wraps productivity suite items ad provides access to mapped properties according to BoundItemDefinition. The IBoundItem interface definition includes:

string BoundItemId {get;}

This gets the ID of the bound item, null if the item is not bound.

string CorrelationId {get;}

This gets the ID of the bound item as defined by the LOB system, null if the item is not defined.

string BoundItemType {get;}

This gets the type associated with the wrapped item, equivalent to the name of BoundItemDefinition, and null if the item is not bound.

BoundItemDefinition BoundItemDefinition {get;}

This gets the definition of the binding.

SynchronizationStatus SynchronizationStatus {get;}

This gets the synchronization status of the bound item.

string BusinessStatus {get;}

This gets the business status of the bound item.

string BusinessDescription {get;}

This gets the business description of the bound item.

object OutlookItem {get;}

This gets the object for the item that being wrapped.

string EntryId {get;}

This gets the EntryId of the wrapped item.

string MessageClass {get;}

This gets the MessageClass of the wrapped item.

DateTime LastModified {get;}

This gets the LastModified timestamp of the wrapped item.

string XmlData {get; set;}

This returns the mapped properties of the wrapped item as an XML string.

string BoundData {get;}

This returns the mapped properties of the wrapped item as an encrypted XML string.

XmlDocument GetXmlDocument ( )

This builds and returns the mapped properties as XmlDocument. The XML is kept in synchronization with fields associated with the wrapped items in the productivity suite.

object GetProperty(string name);

This returns the value of mapped property by name.

void SetProperly(string name, object value);

This method changes the value of mapped property by name.

event PropertyChangedEventHandler PropertyChanged;

This event is raised when the value of a property changes.

event EventHandler<PropertyErrorEventArgs>PropertyError;

This event is raised when an error happens while assigning values to properties.

void Validate( );

This method validates the XML containing mapped properties against the XML schema from BoundItemDefinition.

void Save( );

This method validates the mapped properties and saves the productivity suite item.

void PromoteProperties( );

This method synchronizes the values of mapped properties between the XML document and various fields in the productivity suite such as UserProperties. Missing fields in the productivity suite are recreated as necessary. The productivity suite item is not saved by this method; call Save explicitly.

void RemoveProperties( );

This method removes all custom productivity suite fields (UserProperties) according to BoundItemDefinition.

void BindItem(string definition);

This method converts the productivity suite item into a bound item.

void BindItem(BoundItemDefinition);

This method converts the productivity suite item into a bound item according to BoundItemDefinition.

void UnBindItem( );

This method unbinds the productivity suite.

The IBoundItemManager service is a public interface for various methods of manipulating BoundItems. The IBoundItemManager public interface includes the following definitions:

IBoundItem CreateBoundItem(string BoundItemType);

IBoundItem CreateBoundItem(BoundItemDefinition definition);

IBoundItem GetBoundItem(object item);

IBoundItem GetBoundItem(string BoundItemId);

IBoundItem GetBoundItem(string BoundItemType, string CorrelationId);

IBoundItem GetBoundItem(BoundItemDefinition definition, string CorrelationId);

Metadata Driven User Interface (UI) Forms

As previously described, metadata can be used to create and customize user interface forms that are useful for productivity suite application such as Microsoft Outlook®. The example metadata described herein supports adding/removing controls, control layout, setting/changing control properties, handling control events, and data binding to controls. Support for adding custom-built controls can also be provided in some embodiments.

There are multiple scenarios where metadata can be used to define UI forms for productivity suite applications. In some scenarios, customizable regions on forms can be designated, while other regions cannot be customized. In one scenario, the user interface controls and data are defined by metadata. In another scenario, field/value pairs can be added to a form using metadata such that forms can be customized. In yet another scenario, field/value pairs can be removed from an existing form using metadata. In still another scenario, field value pairs on one form can be translated between into another form to suit end-user preferences.

A UI forms developer can specify the UI for a form/dialog by defining the UI form with metadata. The developer has significant flexibility in defining the UI form so that controls can be added or removed, control properties can be set and/or changed, and the layout of the various controls on the form can be specified, all through the use of metadata.

Figure 14A:
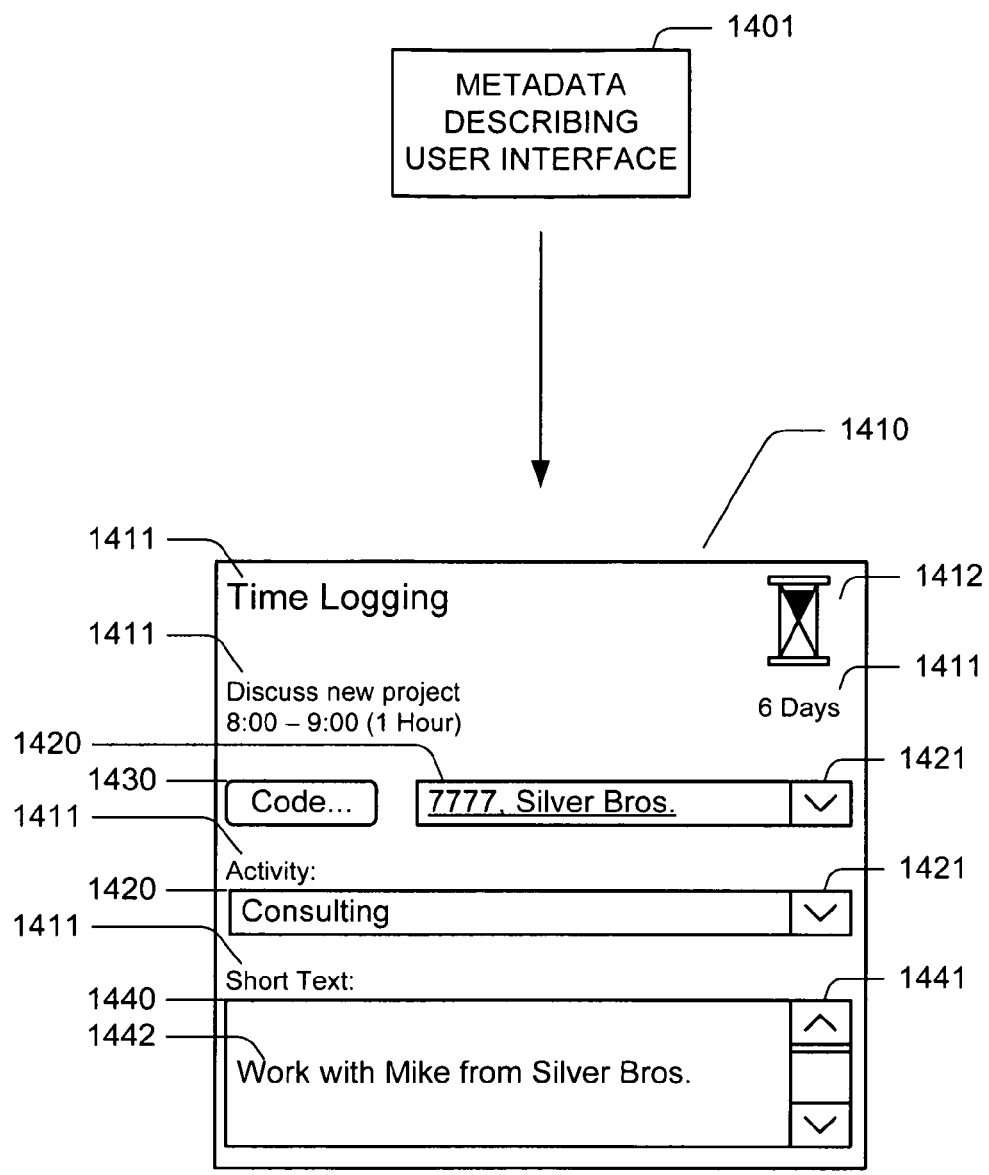
FIGS. 14A-14D illustrate example UI forms that are generated from metadata.

An example UI form is illustrated in FIG. 14A. Metadata (1401) describing the user interface is generated by the developer to define various regions in the form. For example, UI form 1410 is defined by metadata 1401 to include labels 1411, a graphic image 1412, and controls for pull-down menus 1420, a selection button 1430, and a text entry box 1440. Each pull-down menu control is illustrated as including a button (1421) for selection of a value in the pull-down menu selection field. The text entry box control (1440) includes scroll up and down buttons (1441) for scrolling through text (1442) that is entered within the text box.

Figure 14B:
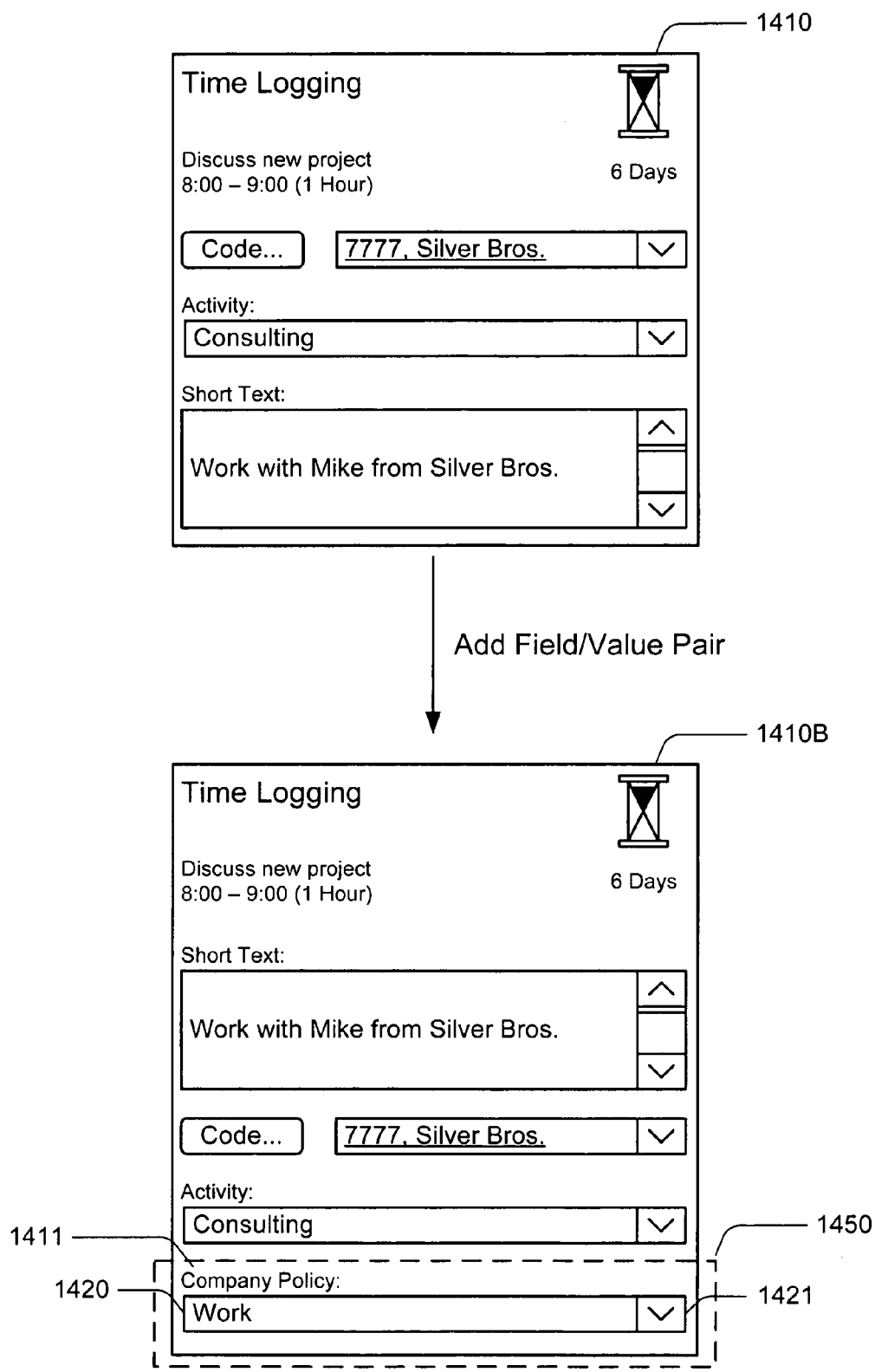

As illustrated in FIG. 14B, UI form 1410 can be customized within certain regions of the UI form such that additional field/value pairs can be added as illustrated by UI form 1410B. UI Form 1410B includes a new section (1450) which includes a label (1411) for a "Company Policy" field, which includes a control for a pull-down menu (1420) with the corresponding button (1421).

Figure 14C:
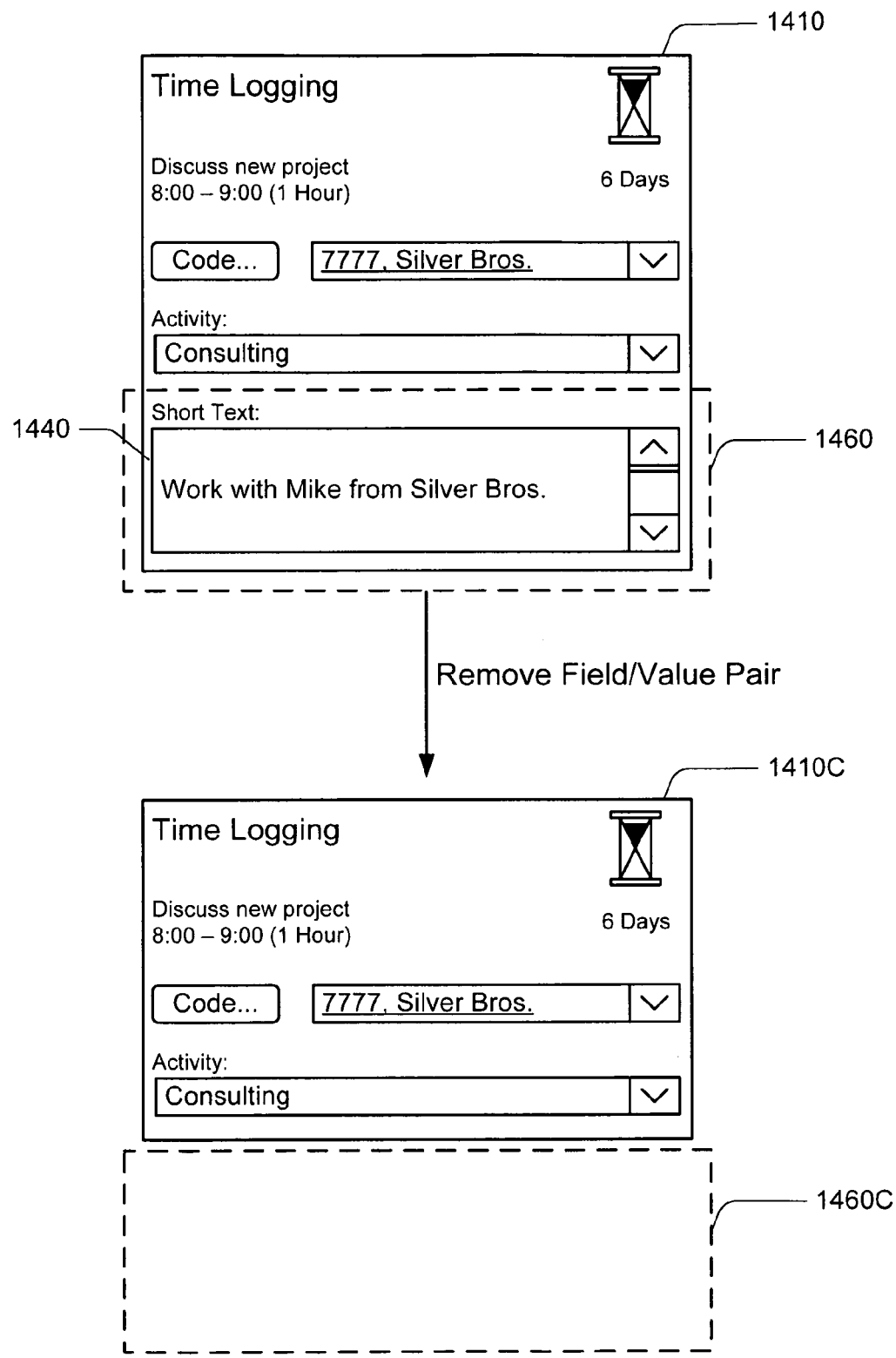

As illustrated in FIG. 14C, UI form 1410 can be customized within certain regions of the UI form such that additional field/value pairs can be removed as illustrated by UI form 1410C. UI Form 1410 includes a region (1460) that with a text entry box (1440) that is then is removed from form 1410C.

Figure 14D:
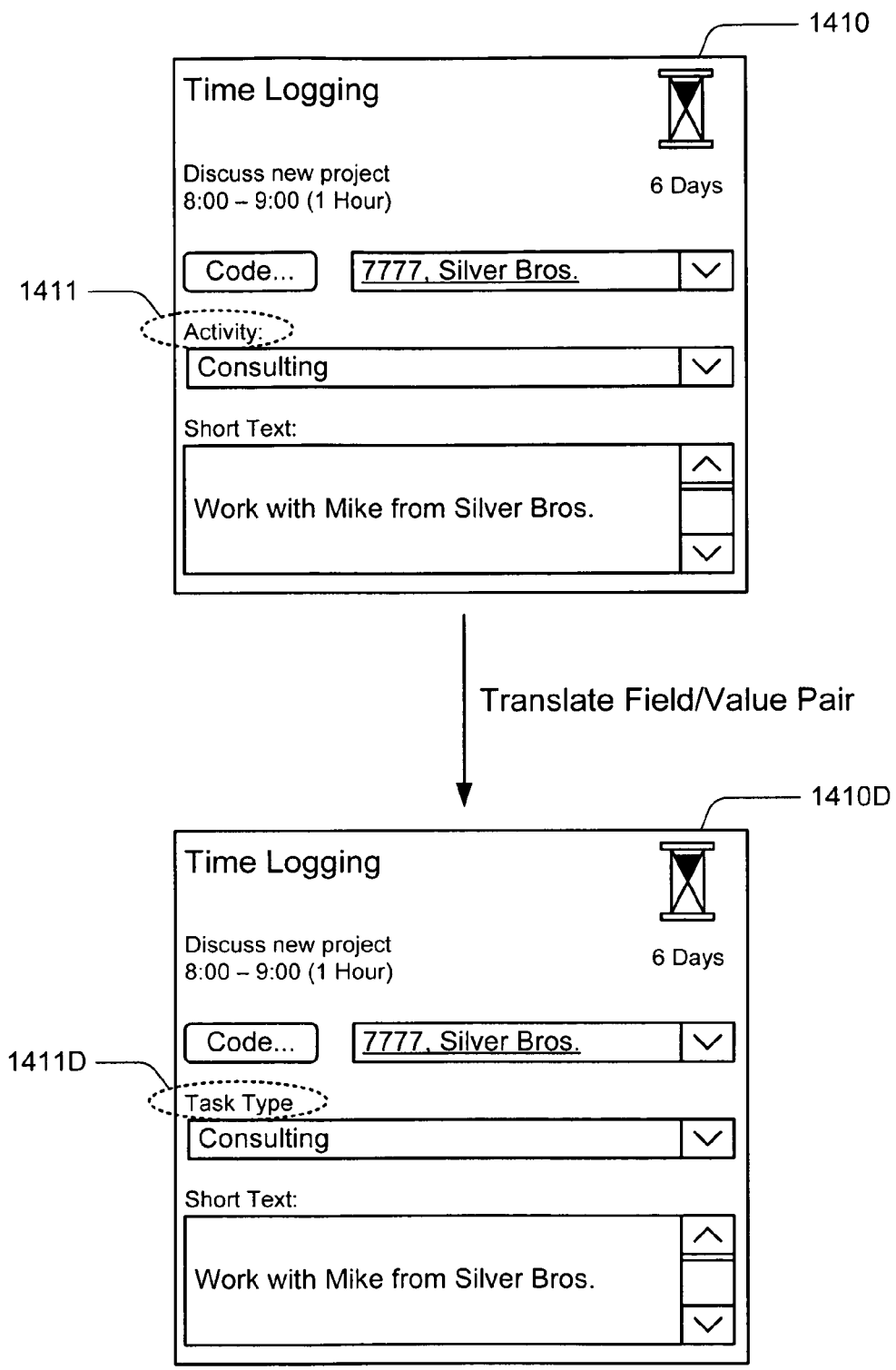

As illustrated in FIG. 14D, UI form 1410 can be customized within certain regions of the UI form such that various field/value pairs can be translated into other field/value pairs to suit user preferences, locales, etc. In this example, the label (1411) named "Activity" from UI form 1410 is translated into a new label (1411D) that is renamed on UI form 1410 as "Task Type".

The metadata can be used by the developer to specify event handlers for a given list of events for each control that mirror the typical events supported for the a forms environment (e.g., WinForms). The developer can specify the names for each event handler in the metadata and also can provide computer readable/executable code for the event-handler to utilize in a code-behind assembly. The name and location of the assembly can also be captured as part of the metadata.

Binding expressions can be specified in the metadata to allow for binding of data from a data source to various properties/fields of controls on the form. The metadata can also be used to specify bindings from control properties to the data source.

The described metadata driven forms UI design includes a set of basic, most commonly used controls that are useful for designing a UI form. However, more complex controls can be custom built for the UI form. A UI rendering engine is arranged to support for rendering basic and custom controls in a productivity suite application. In one example, a custom form can be presented in Microsoft Outlook®. In another example, a custom task pane can be presented in an Information Bridge Framework or IBF. The various custom and basic controls can be accessed by properties that are available from code behind assembly (e.g., as a form that exposes an object model). The controls can be hosted in a variety of environments such as task panes, forms, etc.

Example Metadata Schema for Defining UI forms

Appendix IV illustrates an example metadata schema for defining UI forms in accordance with at least one aspect of the present disclosure. The example schema from Appendix III is further illustrated by FIG. 15 and FIG. 16, which illustrate the various control types and classes for the controls that can be defined in metadata.

Figure 15:
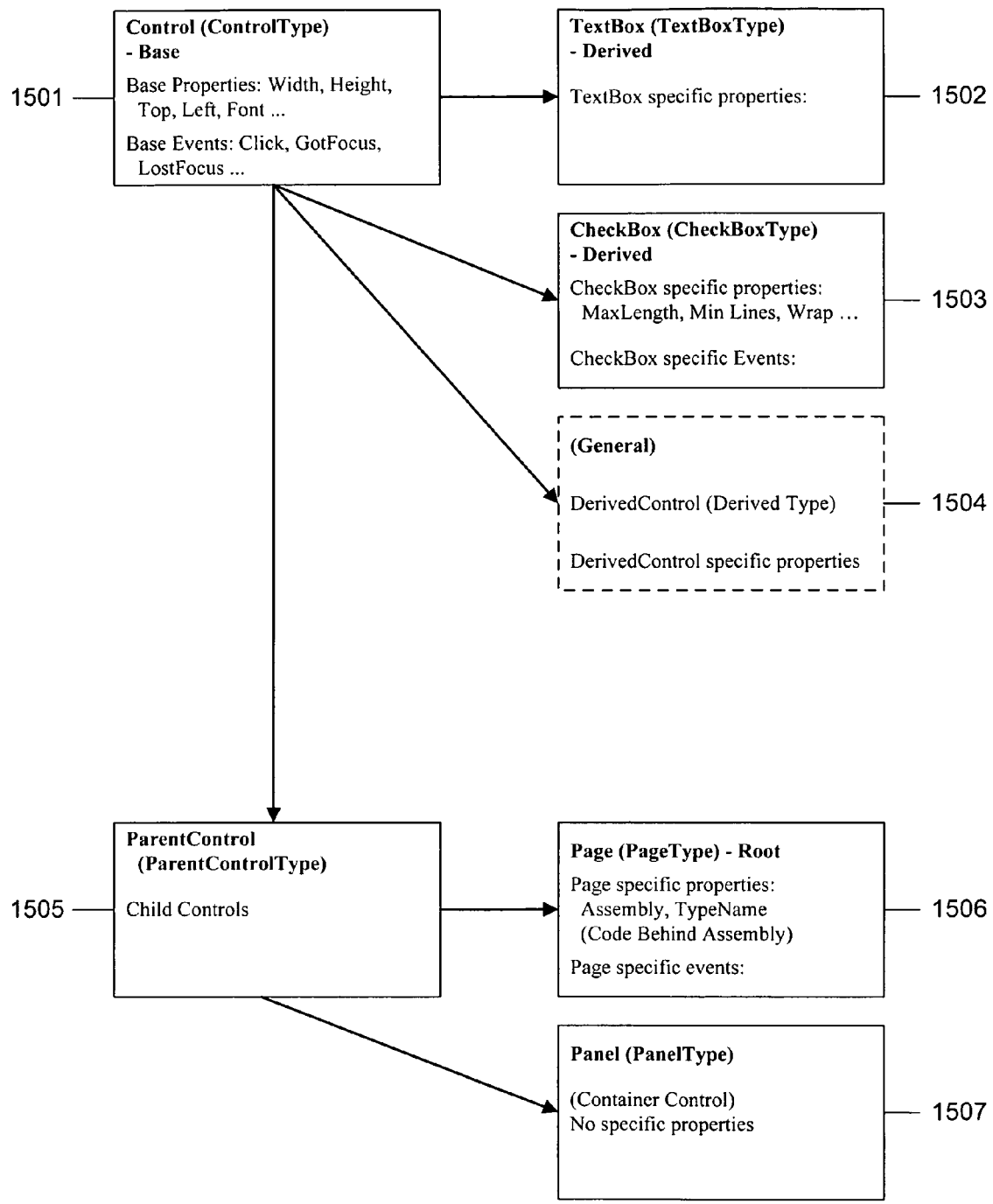
FIGS. 15-16 illustrate various control types and classes for controls that can be defined in metadata.

As shown in FIG. 15., all controls have a base control type (1501) that includes a series of base properties and base events. Example of base properties includes the layout and dimensions of the control (e.g., width, height, top, left, etc.). Examples of base events include click, gotfocus, lostfocus, etc. Controls can be of any type such as textboxes (1502), checkboxes (1503), or some other general type (1504) that can be derived from other types.

Textbox controls (1502) include a set of specific properties such as text alignment, length of the text box, number of minimum lines the text box uses, text wrap characteristics, to name a few. Checkbox controls (1503) include checkbox specific properties such as text alignment, status of the box as checked or unchecked, and any specific events related to checkboxes such as a change in the status for the checkbox from checked to unchecked and vice-versa.

Each control also inherits properties from a parent control (1505), where the parent control can be a page type control (1506) or a panel type control (1507). Page type controls (1506) have a variety of specific properties such as a page name, a specified datasource, an assembly (e.g., codebehind, etc.), a typename, and any other events such as load, etc. Panel type controls (1507) have no specific properties, and are instead a container for the control.

Figure 16:
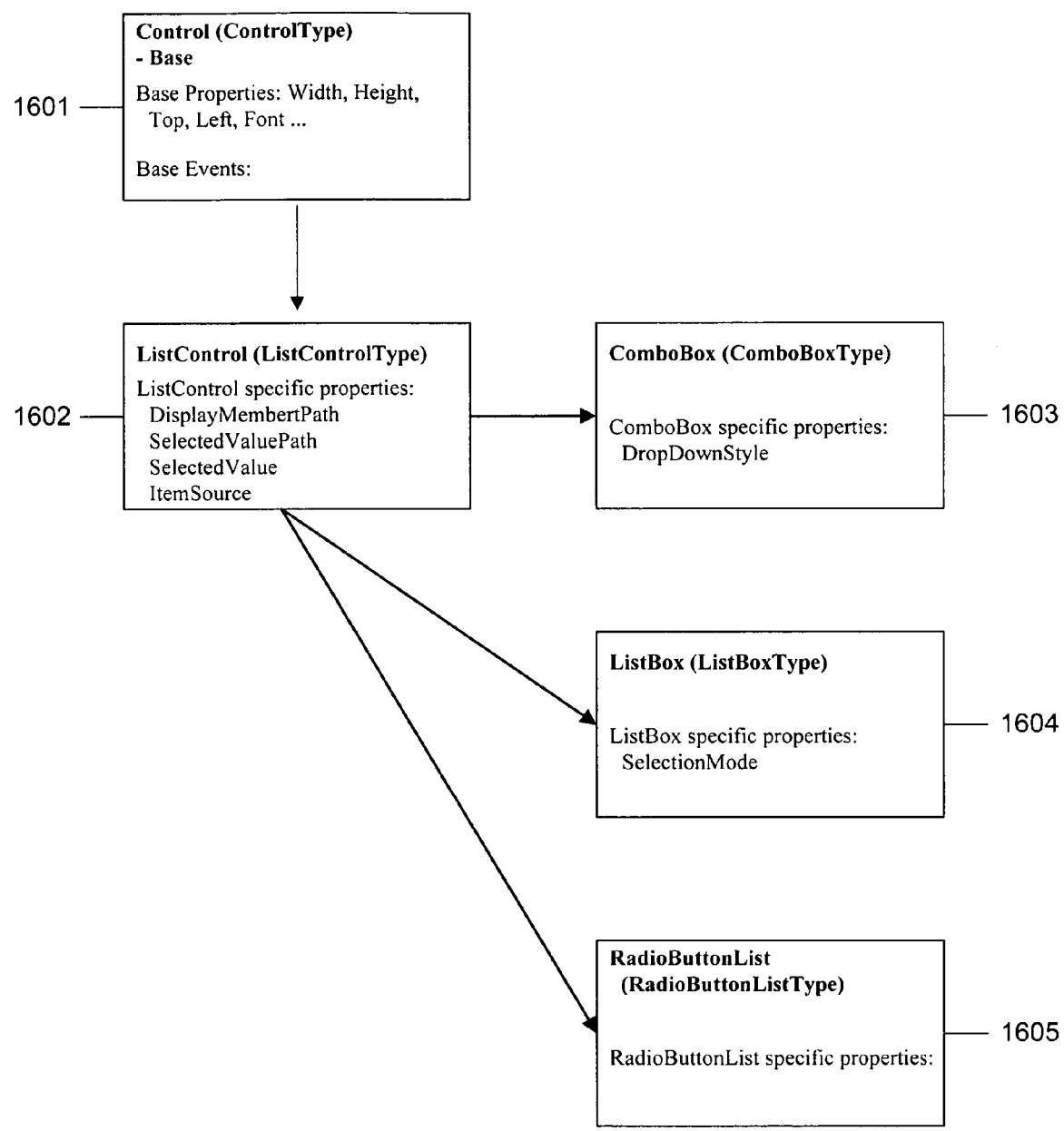

As illustrated by FIG. 16, list controls are different from the other controls in that list controls have child nodes that specify additional items for the list. Each list control also has a base control type (1601) that includes a series of base properties and base events, as previously described.

The list control type (1602) includes a set of specific properties such as display member path, selected value path, selected value, items source, and selected index. The list control type has a further type that specifies the style for the list as one of a combination box type (1603), a list box type (1604), and a radio button list type (1605).

The combination box type (1603) has specific properties to specify a dropdown style box. The list box type (1604) has specific properties for the mode of selection for the list. The radio button list type (1605) has specific properties for a specified radio button.

The format of the UI form can be completely defined by the metadata in such a way that the layout and controls used in the form are extremely flexible. For example, the various controls and field/value pairs can be added, removed, or translated as described previously. Event handlers can be defined by code in a code-behind assembly section of the metadata so that default behavior from the event handlers can be overridden. Since the name and location of the assembly can be captured in the metadata the handling of events for controls is very flexible. Additionally, bindings between the data source and the properties fields of the control on the UI form can be specified from data source to form, or from control property to data source as may be desired. All of these features are supported by a rendering engine that receives the metadata and renders the UI.

Example Rendering Engine and Binding Features

Figure 17:
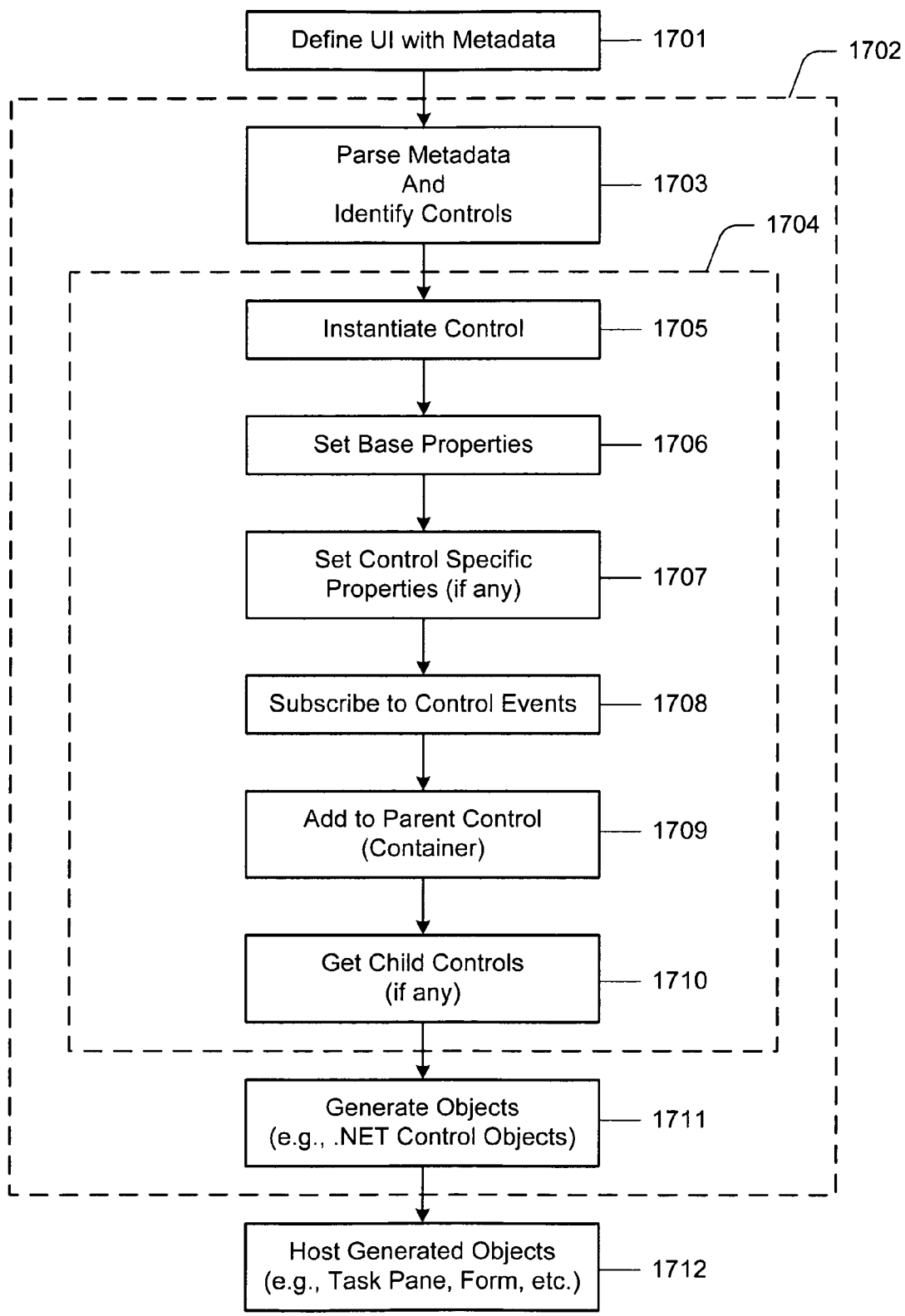
FIG. 17 is a flow chart for an example rendering engine.

An example process for the rendering engine is illustrated in FIG. 17. The UI form is specified in metadata at block 1701. Block 1702 represents the UI rendering engine, which renders all of the features from the UI form from blocks 1703-1711. Once the UI form is rendered, the output is provided such that the generated objects can be hosted at block 1712 in a task panel, on a custom form, or any other desired hosting region that may be used in conjunction with a productivity suite application.

At block 1703, the UI rendering engine parses the metadata and identifies the various controls that are contained therein. At block 1704, which includes blocks 1705-1710, the rendering engine instantiates each different control defined for the UI and outputs a control describing the UI form. The output is used to generate a set of objects at block 1711, where each object may be represented in a form that is acceptable for hosting such as a .NET control object, for example.

At block 1705, a control is instantiated. The base properties for the control are set at block 1706, and any control specific properties are set for the control at block 1707. At block 1708, the rendering engine will subscribe to any control events that are necessary for the control to properly function. Continuing to block 1709, the rendering engine adds the control to the container for the parent control, and subsequently at block 1710 determines if any child controls are required such as for a list type control as previously discussed. The process (1704) specified by blocks 1705-1710 is repeated for all controls on the form until all of the objects for the form are rendered.

As described previously, the UI forms developer can write their own event handlers for control events occurring on the form. To handle a specific event on a control the solution developer, in one embodiment, needs to: develop a code behind assembly which contains the event handler code, specify the code behind assembly in the metadata, and, specify the event handler (method) name (which should be present in the code behind assembly) that handles a particular event for a control. An example code behind assembly is specified as follows in metadata:

```
<jaml:Page Load="PageLoad" Name="My Custom Page"
xmlns:jaml="urn-Mendocino/jaml" Top="0" Left="0" Width="320"
Height="400" Assembly="CodeBehind, Version=1.0.0.0,
Culture=neutral, PublicKeyToken=null" TypeName="CodeBehind.-
PageCodeBehind">
```

The code behind assembly, in one embodiment, is specified by the "Assembly" attribute of the "Page" element in the UI metadata file. The "Page" element is the root element in the metadata file. The "TypeName" attribute specifies the class in the assembly which contains the event handler methods. In one embodiment, each "Page" or UI form has only one code behind assembly which would contain all the event handlers for controls on that form.

To specify an event handler in the metadata for an event on a control, in one embodiment, the event handler method name should be present in the code behind assembly as the value of the attribute corresponding to the event on the control. For example, the metadata necessary to capture the "Click" event on a Button control can be specified as follows:

```
<jaml:Button Left="8" Width="100" Top="132"
Background="Control" Name="button1" Text="This is a button"
Click="Button1_Click" />
```

The above metadata specifies that the "Click" event for the Button control is handled by the method "Button1_Click" which should be present as a public method in the code behind assembly. Also, the signature for the event handler, in one embodiment, is same as for the event on that particular control in case of .NET Winforms environment. An example event handler signature for a click event on a Button can be expressed as follows: public void Button1_Click(object sender, System.EventArgs e) { }

The UI Rendering engine, in one embodiment, loads the code behind assembly when it parses the UI metadata and instantiates the code behind class (through reflection). All events (exposed through the metadata) on a control are subscribed to when that control is instantiated during the parsing of the UI metadata as previously discussed. Thus, when a particular event is raised by a control from the event handler in code, the event handler present in the code behind assembly is used. The necessary arguments necessary for handling the event are passed through reflection.

As previously discussed, data can be bound to controls on the UI form as data coming from a specified data source. The data sources are specified in the metadata such as by the following example:

```
Data Source <jaml:DataSource Name="myDataSource"
Assembly="DataSourceAssembly, Version=1.0.0.0, Culture=neutral,
PublicKeyToken=null" TypeName="DataSourceNamespace.-
DataSourceClass" />
```

The "DataSourceClass" can implement the "IBindData" and "INotifyPropertyChanged" interfaces, as follows below:

```
public interface IBindData
{
    object GetData(string path);
    bool SetData(string path, object val);
}
public interface INotifyPropertyChanged
{
    event PropertyChangedEventHandler PropertyChanged;
}
public delegate void PropertyChangedEventHandler(object sender,
PropertyChangedEventArgs e);
public class PropertyChangedEventArgs : System.EventArgs
{
    public virtual string PropertyName { get; }
}
```

The "IBindData" interface allows data to be bound between the data source and the control properties. The "INotifyPropertyChanged" interface, in one embodiment, allows the data source to signal any changes that happen on the data source so that the UI properties which are bound to that data source can be updated. The data source thus needs to raise the "PropertyChanged" event whenever a property in the data source changes. The event handler code updates the relevant properties on the UI whenever the event fires.

Figure 18:
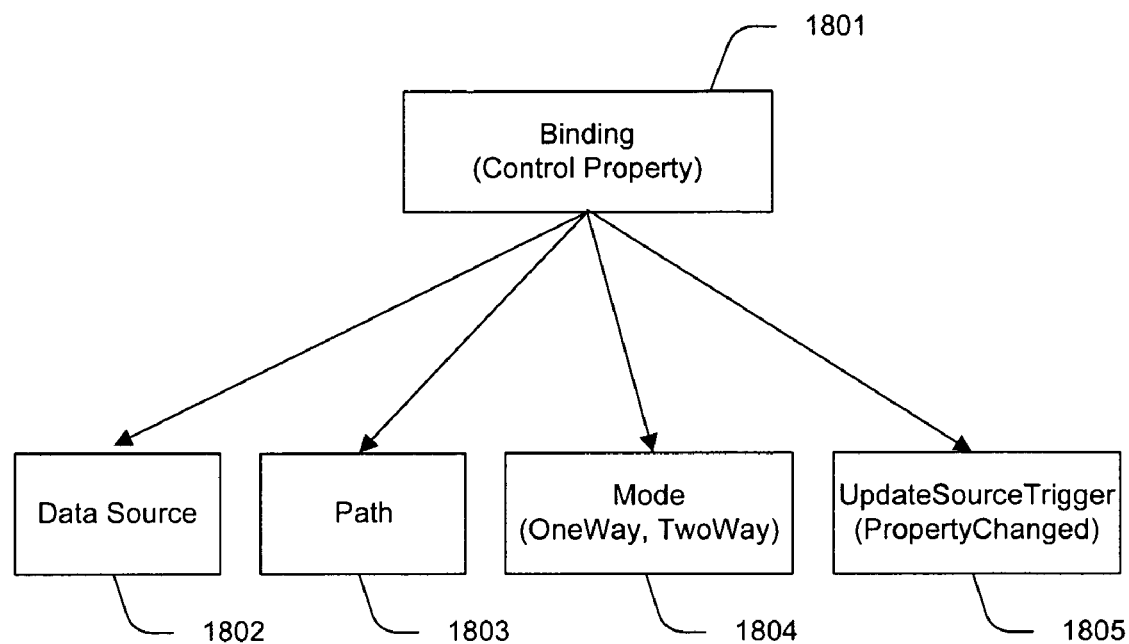
FIG. 18 illustrates the various properties that can be used to specify a data binding to a control property APPENDIX I illustrates an example schema for synchronization between a productivity suite application (e.g., Microsoft Outlook®) and a line of business application.

Once the data sources are specified in the metadata, then in one embodiment, any property of a control can be bound to data coming from a data source. FIG. 18 illustrates the various properties that can be used to specify a data binding to a control property. A binding (1801) is specified that identifies a data source (1802), a path for the data source (1803), a mode for the binding (1804), and an trigger for the data source (1805). The binding expression must be specified for the control property binding to be properly created.

In one example, a binding is specified for a control property by specifying a "Binding Expression" as the value of the attribute corresponding to the control property. For example, to bind the "Text" property of a text box control a binding expression can be expressed in metadata as follows:

```
<jaml:TextBox Name="textBox1" Top="40" Left="8" Width="200"
Text="{Binding Source=DataSourceName, Path=CustomerName,
Mode=TwoWay}" Anchor="Top,Left,Right" />
```

For this example, the expression Text="{Binding Source=DataSourceName, Path=CustomerName, Mode=TwoWay}" is a binding expression for the "Text" property. The "Source" clause, refers to a data source defined in the metadata. The value specified by the "Path" clause is passed to the data source's "GetData(string path)" method when retrieving the value for the bound property. The "Mode" clause indicates the binding type as "TwoWay", indicating that property changes from the UI can propagate back to the data source, and vice-versa. In another embodiment, changes from the data source can only propagate to the UI control when the binding is specified as "OneWay".

The "UpdateSourceTrigger" illustrated in FIG. 18 can be used to specify an event that signals the data source that a UI property has changed, and that the changed property value needs to be propagated to the data source. By default, the value for this clause can be set to "PropertyChanged", which means that when a bound property changes then it would be signaled to the data source. In some embodiments, the "Property Changed" clause only takes effect when two-way binding is used.

An IBindable interface can be defined for all controls that participate in a data binding. An example interface is defined as:

```
public interface IBindable
{
    object GetBoundValue(string propName);
    void SetBoundValue(string propName, object val);
}
```

The binder can be implemented as an portion of the UI rendering engine, or as an independent component. An example binder can maintain a list of all data sources that are specified in the metadata, as well as a list of all bindings in the metadata. Initially, when the UI form is rendered, the "GetData(string path)" method for the relevant data source (specified in the binding expression) is called passing in the value of the "Path" clause in the binding expression as an argument. The method returns a value of type "object". The "SetBoundValue(string propName, object value)" is called on the control whose property is bound passing in the name of the bound property and the "value" returned by the data source. The control has the responsibility for understanding the "value" object and interpreting it to update the bound property appropriately.

Besides the initial rendering of the UI form, whenever the data source changes, the data source can signal the binder of a change in the data source using the (INotifyPropertyChanged) event. The binder identifies which control properties are bound to the changed data source and updates those properties accordingly.

As previously discussed, custom controls can also be utilized. Custom controls can be derived as previously described. In one example, the following interfaces should be defined: the custom control should derive from the class 'System.Windows.Forms.UserControl', implement the 'IBindable' interface so that the custom control participates in data binding, implement the 'ICustomControl' interface, define a default constructor (no arguments) for the control. An example custom control is defined as follows:

```
public interface ICustomControl
{
    void SetControlProperty(string propName, string propValue);
    event ControlEventFiredHandler ControlEventFired;
}
public delegate void ControlEventFiredHandler(object sender,
ControlEventFiredArgs e);
public class ControlEventFiredArgs : System.EventArgs
{
    public string EventName { get; }
    public object Sender { get; }
    public object EventArgs { get; }
}
```

In one embodiment, every custom control implements the 'ICustomControl' interface, which has a method 'SetControlProperty( )' and a single event 'ControlEventFired'.

The 'SetControlProperty(string propName, string propValue)' method can be used by the UI Rendering Engine framework to set custom properties for the control. For every custom property which the custom control exposes and which is not included in the basic properties of a Control (e.g. Width, Height, Top, Left etc) the UI Rendering engine can call the 'SetControlProperty' method on the custom control. The custom control is required to understand and interpret the 'string' property value specified in the metadata which would be passed to the 'SetControlProperty' method.

The 'ControlEventFired' event can be raised by the custom control when a custom event exposed by the control fires. The UI rendering engine interprets that an event has fired on the custom control and calls the event handler for the event in the code behind assembly if such code exists. The UI rendering engine does not know at compile time what events are supported by the custom control. Instead, the UI rendering engine can requires the custom control to notify the rendering engine when a custom event fires on the custom control. The custom control can create an instance of the 'ControlEventFiredArgs' class and pass it to the 'ControlEventFired' event which is received by the UI rendering engine. The 'ControlEventFiredArgs' contain information about the name of the event that fired, identifies the sender, and identifies any event arguments that need to be passed to the event handler for that event. Once the UI rendering engine has the information, the rendering engine calls the event handler for that event specified in the code behind assembly.

In one example embodiment, custom controls reside in a .NET assembly at run time. The custom control assembly can be specified in the metadata in the following way:

```
<jaml:Mapping XmlNamespace="urn-Mendocino/CustomControls"
ClrNamespace="CustomControlNamespace"
Assembly="CustomControlAssembly, Version=1.0.0.0,
Culture=neutral, PublicKeyToken=null" />
```

The 'Mapping' element, in one embodiment, is taken from Microsoft's Windows Presentation Foundation (WPF) but there it is a processing directive rather than an XML element. A custom control can be specified in the metadata through the following metadata:

```
<custom:CustomControl xmlns:custom="urn-Mendocino/
CustomControls" Top="0" Left="0" Height="100" Width="100" .../>
```

The UI Rendering engine, in one embodiment, instantiates the custom control through reflection and first set the basic properties of a control like Height, Width, Top, Left etc. Then for other properties (custom properties) the UI engine can call the 'SetControlProperty( )' method on the custom control.

The UI forms developer can access the UI controls and their properties in the code behind assembly as previously discussed. The code behind class needs to implement the 'IPageCodeBehind' interface. One embodiment of the 'IPageCodeBehind' interface is described below:

```
public interface IPageCodeBehind
{
    IPageControlCollection PageControls { get;set; }
}
```

The 'PageControls' property can be populated by the UI rendering engine when it renders the UI form and instantiates the controls. One embodiment of the 'IPageControlCollection' interface is defined below:

```
public interface IPageControlCollection : ICollection, IEnumerable
{
    IPageControl this[string name] { get; }
}
```

The 'IPageControl' interface, in one embodiment, exposes the properties for a control on the form.

```
public interface IPageControl
{ // Properties...
    string Name{ get;set; }
    int Top { get;set; }
    int Left { get;set; }
    Color Background { get;set; }
    bool IsEnabled { get;set; }
    int Height { get;set; }
    int Width { get;set; }
    // Other properties //... }
```

The above described embodiment allows the UI forms developer to access a control on the form in the following way:

MessageBox.Show(this.PageControls["myButton"].
  Text);

The 'IPageControl' interface, in one embodiment, only exposes the basic properties of a control (common to every control). To access specific properties for a control (e.g. IsChecked for a CheckBox control) you can cast the 'IPageControl' object to the specific control interface like 'IPageCheckBox', 'IPageTextBox' etc. This allows you access specific properties for a control.

((IPageCheckBox)this.PageControls["myCheckBox"]).
  IsChecked

The 'IPageCheckBox' interface, in one embodiment, derives from the 'IPageControl' interface as:

```
public interface IPageCheckBox : IPageControl
{ // CheckBox specific properties...
    ContentAlignment TextAlignment {get; set;}
    bool IsChecked {get; set;}
}
```

Similarly, specific interfaces for every control are exposed which allow the UI forms developer to access control specific properties.

The UI Rendering Engine can be arranged to generate the same .NET control from the metadata describing the UI form irrespective of whether the UI form is hosted in a task pane or a productivity suite form (e.g., an Outlook® custom form). In one example, the .NET control is hosted as follows below The task pane can be arranged to support hosting any .NET control which implements the 'IRegion' interface. The UI Rendering framework can be arranged to include a blank (empty) .NET control that implements the 'IRegion' interface, and which hosts the .NET control generated by the UI rendering engine from the UI metadata. To show a metadata defined UI form in the task pane, the 'MSIBF.UI.ShowRegion' custom operation can be used to show the blank .NET host control part of the UI rendering framework. The input passed to this 'MSIBF.UI.ShowRegion' operation is the metadata defining the UI form which is to be hosted in the task pane. The MSIBF.UI.ShowRegion' operation can instantiate the blank host .NET control and pass the metadata defining the UI form as 'Data' to the blank host .NET control. The host control can be arranged to call the UI rendering engine component passing in the metadata defining the UI form and which returns a .NET control describing the UI form and which is then added to the host control resulting in the display of the UI form in the task pane.

To host a .NET control describing a UI form in a productivity suite such as an Outlook® form, can be accomplished by adding an ActiveX container control capable of hosting .NET controls to the Outlook® form and then adding the .NET control describing the UI form as a child control of the container control. The ActiveX container control is a part of the UI Rendering framework.

While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems disclosed herein without departing from the scope of the invention. Since many embodiments of the invention can be made without departing from the spirit and scope of the invention, the invention resides in the claims hereinafter appended.

What is claimed is:

1. A computer readable storage medium having computer executable instructions stored thereon for interfacing with a productivity suite application, the instructions comprising:
identifying a control in a user interface, wherein the user interface is defined in metadata;
instantiating the identified control;
setting properties associated with the identified control;
subscribing to at least one control event associated with the identified control, wherein the at least one control event is specified by the metadata that defines the user interface by a metadata definition, which is included in the metadata the defines the user interface, that associates a property of the identified control with bound data in a synchronization data store; wherein the bound data is data that is bound between the productivity suite application and a line of business application, wherein the data may be bound such that data is propagated from the line of business application to the productivity suite application and from the productivity suite application to the line of business application, wherein the synchronization data store stores synchronization data differences between line of business application entities and productivity suite items and the synchronization data is represented by extensible markup language (XML); and wherein changes to the properties within the identified control automatically propagate to the synchronization data store such that changes to the properties are then submitted to the line of business application for update as a list of change requests that are generated by the synchronization data store;
generating objects associated with the control; and
hosting the generated objects with the productivity suite application.

2. The computer readable storage medium of claim 1, the instructions further comprising:
detecting a trigger associated with the control event; and
propagating a change from a productivity suite item to a field associated with the control in response to the detected trigger.

3. The computer readable storage medium of claim 2, wherein the trigger associated with the control event is detected by an event handler that is associated with the step of subscribing to the at least one control event.

4. The computer readable storage medium of claim 3, wherein the event handler is defined by code that is specified in the metadata.

5. The computer readable storage medium of claim 1, the instructions further comprising:
detecting a trigger associated with the control event; and
propagating a change from a property of a user interface form that is hosted by the productivity suite application to an item of the productivity suite in response to the detected trigger.

6. The computer readable storage medium of claim 5, wherein the trigger associated with the control event is detected by an event handler that is associated with the step of subscribing to control events.

7. The computer readable storage medium of claim 6, wherein the event handler is defined by code that is specified in the metadata that defines the user interface.

8. The computer readable storage medium of claim 1, wherein the hosted generated objects are hosted in at least one of a window, a task pane, and a productivity suite form.

9. The computer readable storage medium of claim 1, the instructions further comprising: binding a data source with a property of the control, wherein the data source is specified in the metadata that defines the user interface.

10. The computer readable storage medium of claim 9, wherein the data source corresponds to a synchronization data store that is associated with the productivity suite application.

11. The computer readable storage medium of claim 1, the instructions further comprising: maintaining a list of data sources that are specified in the metadata that defines the user interface.

12. The computer readable storage medium of claim 11, the instructions further comprising: maintaining a list of bound properties associated with the user interface, wherein at least one bound property is specified for the control in the metadata that defines the user interface.

13. The computer readable storage medium of claim 1, the instructions further comprising: translating at least one field/value pair for the user interface based on at least one of a user selected preference and a locale setting.

14. An apparatus arranged to access data items associated with a productivity suite application with a hosted user interface, the apparatus comprising:
a processor;
a computer-readable medium;
an operating environment stored on the computer-readable medium and executing on the processor; and
an application operating under the control of the operating environment and operative to perform actions, wherein the application is arranged to:
parse metadata that defines the hosted user interface;
identify at least one control that is associated with the parsed metadata;
for each control that is identified:
instantiate the control;
set properties associated with the control;
subscribe to a control event associated with the control, wherein the control event is specified by the metadata that defines the user interface by a metadata definition that associates a property of the identified control with bound data in a synchronization data store wherein the bound data is data that is bound between the productivity suite application and a line of business application, wherein the data may be bound such that data is propagated from the line of business application to the productivity suite application and from the productivity suite application to the line of business application, wherein the synchronization data store stores synchronization data differences between a line of business application entity and a productivity suite item;
automatically notify the synchronization data store that the bound data has changed when the control event occurs such that the bound data may be synchronized with the productivity suite and the line of business application; and wherein the changes to the bound data are submitted to the line of business application for update as a list of change requests that are generated by the synchronization data store; and
generate an object associated with the control; and
host each object that is generated for each control.

15. The apparatus of claim 14, wherein the application is further arranged to: bind a property associated with a control to a data source, wherein the data source is specified by at least one of: a data source name, a data source path, a link, a data source mode, a data source trigger event.

16. A method for interfacing a productivity suite application with a hosted user interface that is specified by metadata, the method comprising:

getting an object, wherein the object is associated with a productivity suite item that is wrapped in an XML data representation that is included within metadata;

retrieving the XML data representation;

determining if the XML data representation is bound to the productivity suite item; wherein a bound item includes a metadata definition that associates a property of a control with bound data in a synchronization data store wherein the bound item is data that is bound between the productivity suite application and a line of business application, wherein the data may be bound such that data is propagated from the line of business application the productivity suite application and from the productivity suite application to the line of business application, wherein the synchronization data store stores synchronization data differences between a line of business application entity and the productivity suite item; wherein the synchronization data stored creates a list of change requests that are submitted to a line of business application for update;

updating the productivity suite item when changes are detected and the XML data representation is for a bound item; and automatically propagating the changes to the productivity suite item to the hosted user interface to reflect the changes.

17. The method of claim 16, wherein the hosted user interface is bound to the productivity suite application through a data source that is specified in the metadata.

18. The method of claim 17, further comprising: propagating a change in a productivity suite item to a property of a control in the hosted user interface by detecting the change in the productivity suite item, and signaling an event handler when the change in the productivity suite item is detected, wherein the event handler is defined by the metadata that specifies the hosted user interface.

19. The method of claim 17, further comprising: propagating a change in a property of a control in the hosted user interface by detecting the change in the property of the control in the hosted user interface, and calling an event handler when the change in the property of the control is detected, wherein the event handler is defined by the metadata that specifies the hosted user interface.

20. The method of claim 17, further comprising: updating a synchronization data store when a change in a productivity suite item is initiated from at least one of the productivity suite application and the hosted user interface.

* * * * *